US012743070B2

(12) United States Patent
Kriveshko et al.

(10) Patent No.: US 12,743,070 B2
(45) Date of Patent: Sep. 22, 2026

(54) SYSTEMS AND METHODS FOR SENSOR REGISTRATION BASED ON FLOOR ALIGNMENT

(71) Applicant: Symbotic LLC, Wilmington, MA (US)

(72) Inventors: Ilya A. Kriveshko, Boxborough, MA (US); Audrey Lewis, Somerville, MA (US); Iris Kutsyy, Somerville, MA (US); U. Murat Erdem, Melrose, MA (US); Scott Denenberg, Newton, MA (US)

(73) Assignee: Symbotic LLC, Wilmington, MA (US)

( * ) Notice: Subject to any disclaimer, the term of this patent is extended or adjusted under 35 U.S.C. 154(b) by 538 days.

(21) Appl. No.: 18/356,631

(22) Filed: Jul. 21, 2023

(65) Prior Publication Data

US 2023/0359162 A1 Nov. 9, 2023

Related U.S. Application Data

(63) Continuation-in-part of application No. 17/994,655, filed on Nov. 28, 2022, now Pat. No. 12,596,346, (Continued)

(51) Int. Cl.
*G05B 19/402* (2006.01)
*G01S 17/04* (2020.01)
(Continued)

(52) U.S. Cl.
CPC ............ *G05B 19/402* (2013.01); *G01S 17/04* (2020.01); *G05B 19/4061* (2013.01);
(Continued)

(58) Field of Classification Search
CPC .............. G05B 19/402; G05B 19/4061; G05B 2219/37555; G05B 2219/40557;
(Continued)

(56) References Cited

U.S. PATENT DOCUMENTS 9,251,598 B2 * 2/2016 Wells .................... G06V 20/52
9,452,531 B2 9/2016 Kikkeri et al.
(Continued)

FOREIGN PATENT DOCUMENTS

EP 0328687 A1 8/1989
JP 06270083 A 9/1994
(Continued)

OTHER PUBLICATIONS

Jeremy A Marvel, et al., Tools for Robotics in SME Workcells: Challenges and Approaches for Calibration and Registration, National Institute of Standards and Techology NISTIR 8093, Nov. 1, 2015, pp. 1-29.

(Continued)

*Primary Examiner* — Gregory M Desire
(74) *Attorney, Agent, or Firm* — Perman & Green, LLP

(57) ABSTRACT

Systems and methods for sensor registration for a workcell including a floor are disclosed. In some embodiments, a disclosed method comprises: disposing a plurality of three dimensional (3D) image sensors proximate to the workcell; acquiring, with the plurality of 3D image sensors, a plurality of 3D images of the workcell, wherein at least one of the plurality of 3D images includes at least a portion of the floor; determining, based on a first user selection of a region of a first image of the plurality of 3D images of the workcell, a first floor point indicating a first portion of the floor in the first image; computing a first floor plane representing the floor based on the first floor point; and registering the 3D image sensors to each other and to the workcell based at least in part on the plurality of 3D images and the first floor plane.

20 Claims, 20 Drawing Sheets
(10 of 20 Drawing Sheet(s) Filed in Color)

Related U.S. Application Data which is a continuation-in-part of application No. 17/412,912, filed on Aug. 26, 2021, now Pat. No. 11,543,796, which is a continuation of application No. 16/553,738, filed on Aug. 28, 2019, now Pat. No. 11,156,981.

(60) Provisional application No. 62/724,945, filed on Aug. 30, 2018.

(51) Int. Cl.
*G05B 19/4061* (2006.01)
*G06T 7/00* (2017.01)
*G06T 7/30* (2017.01)

(52) U.S. Cl.
CPC ................ *G06T 7/001* (2013.01); *G06T 7/30* (2017.01); *G05B 2219/37555* (2013.01); *G05B 2219/40557* (2013.01); *G06T 2207/10028* (2013.01); *G06T 2207/30164* (2013.01)

(58) Field of Classification Search
CPC . G06T 7/30; G06T 7/001; G06T 2207/10028; G06T 2207/30164; G01S 17/04
See application file for complete search history.

(56) References Cited

U.S. PATENT DOCUMENTS

| | | | | |
|---|---|---|---|---|
| 9,524,426 | B2 * | 12/2016 | Kim | G06V 10/764 |
| 9,796,089 | B2 | 10/2017 | Lawrence, III et al. | |
| 10,126,116 | B2 | 11/2018 | Becker | |
| 10,445,944 | B2 | 10/2019 | Galera et al. | |
| 10,540,552 | B2 * | 1/2020 | Ju | G06T 7/194 |
| 10,803,611 | B2 | 10/2020 | Kay et al. | |
| 10,919,144 | B2 | 2/2021 | Sinnet | |
| 11,054,802 | B2 * | 7/2021 | Taguchi | G05B 19/4069 |
| 2013/0086801 | A1 | 4/2013 | Mimura et al. | |
| 2013/0201292 | A1 | 8/2013 | Walter et al. | |
| 2014/0207285 | A1 | 7/2014 | Sakabe | |
| 2016/0035079 | A1 | 2/2016 | Tenney et al. | |
| 2016/0354927 | A1 | 12/2016 | Kikkeri et al. | |
| 2017/0302905 | A1 | 10/2017 | Shteinfeld et al. | |
| 2018/0222052 | A1 | 8/2018 | Vu et al. | |
| 2019/0262991 | A1 | 8/2019 | Sugiyama et al. | |
| 2019/0262993 | A1 | 8/2019 | Cole et al. | |
| 2020/0143564 | A1 | 5/2020 | Ross | |
| 2020/0164516 | A1 | 5/2020 | Lehment et al. | |

FOREIGN PATENT DOCUMENTS

| | | | |
|---|---|---|---|
| JP | 2004163200 | A1 | 6/2004 |
| JP | 2009121053 | A | 6/2009 |
| JP | 2012057960 | A | 3/2012 |
| WO | 2002023121 | A1 | 3/2002 |
| WO | 2012091807 | A2 | 7/2012 |
| WO | 2018148181 | A1 | 8/2018 |

OTHER PUBLICATIONS

Tim Beyl, et al., Time-of-flight-assisted Kinect camera-based people detection for intuitive human robot cooperation in the surgicial operating room, International Journal of Computer Assisted Radiology and Surgery, Springer, DE, vol. 11, No. 7, Nov. 14, 2015, pp. 1329-1345.

Justinas Misei Kis, et al., Multi 3D camera mapping for predictive and reflexive robot manipulator trajectory estimation, 2016 IEEE Symposium Series on Computational Intelligence (SSCI), Dec. 6, 2016, pp. 1-8.

Bernard Schmidt, et al., Depth camera based collison avoidance via active robot control, Journal of Manufacturing Systems, vol. 33, No. 4, Oct. 1, 2014, pp. 711-718.

European Search Report, Patent Application No. PCT/US2019/048520, dated May 16, 2022, 12 pages.

* cited by examiner

SYSTEMS AND METHODS FOR SENSOR REGISTRATION BASED ON FLOOR ALIGNMENT

CROSS-REFERENCE TO RELATED APPLICATIONS

This application is a continuation-in-part of U.S. Ser. No. 17/994,655, filed on Nov. 28, 2022, which is itself a continuation-in-part of U.S. Ser. No. 17/412,912, filed on Aug. 26, 2021, now U.S. Pat. No. 11,543,796, which is itself a continuation of U.S. Ser. No. 16/553,738, filed on Aug. 28, 2019, now U.S. Pat. No. 11,156,981, which claims the benefit of and priority to U.S. Ser. No. 62/724,945, filed on Aug. 30, 2018. The entire disclosures of the foregoing priority documents are hereby incorporated by reference.

TECHNICAL FIELD

The present teaching relates, in general, to sensors in a three-dimensional (3D) space, and, in particular, to systems and methods for performing automatic estimation of a sensor's position and orientation in 3D space.

BACKGROUND

Industrial machinery is often dangerous to humans. Some machinery is dangerous unless it is completely shut down, while other machinery may have a variety of operating states, some of which are hazardous and some of which are not. In some cases, the degree of hazard may depend on the location or distance of the human with respect to the machinery. As a result, various types of "guarding" equipment have been developed to separate humans and machines, thereby preventing machinery from causing harm to humans. One very simple and common type of guarding is a cage that surrounds the machinery, configured such that opening the door of the cage causes an electrical circuit to place the machinery in a safe state (e.g., shutting down the machinery). This ensures that humans can never approach the machinery while it is operating in an unsafe state.

More sophisticated types of guarding may involve, for example, optical sensors. Examples include light curtains that determine if any object has intruded into a region monitored by one or more light emitters and detectors, and two-dimensional (2D) LIDAR sensors that use active optical sensing to detect the minimum distance to an obstacle along a series of rays emanating from the sensors (and thus can be configured to detect either proximity or intrusion into pre-configured 2D zones). In addition, 3D depth sensors have been recently employed in various machine-guarding applications for providing guarding improvement. Examples of the 3D depth sensors include 3D time-of-flight cameras, 3D LIDAR, and stereo vision cameras. These sensors offer the ability to detect and locate intrusions into the area surrounding industrial machinery in 3D, which gives them several advantages over 2D sensors. For example, a 2D LIDAR system guarding the floorspace around an industrial robot will have to stop the robot when an intrusion is detected well over an arm's-length distance away from the robot, because if the intrusion represents a person's legs, that person's arms could be much closer and would be undetectable by the 2D LIDAR. However, a 3D system can allow the robot to continue to operate until the person actually stretches his or her arm towards the robot. This allows for a much tighter coupling between the actions of the machine and the actions of the human, which provides flexibility in many applications and saves space on the factory floor, which is always at a premium.

Because human safety is at stake, guarding equipment (particularly the electronic versions) must comply with stringent industry standards regarding functional safety, such as IEC 61508 and ISO 13849. These standards specify failure rates for hardware components and rigorous development practices for both hardware and software components; a system is considered safe for use in an industrial setting only when the hardware and software components comply with the standards. Standards-compliant systems must ensure that dangerous conditions and system failures can be detected with very high probability, and that the system responds to such events by transitioning the equipment being controlled into a safe state. For example, safety systems may be tuned to favor false positives over false negatives in order to avoid hazardous consequences resulting from the false negatives.

Separation of humans and machines, however, is not always optimal for productivity. For example, some tasks are best performed by a human and machine working collaboratively; machines typically provide more strength, faster speed, higher precision, and more repeatability, while humans may offer flexibility, dexterity, and judgment far beyond the abilities of even the most advanced machines. An example of a potential collaborative application is the installation of a dashboard in a car—the dashboard is heavy and difficult for a human to maneuver but easy for a machine, and attaching it requires a variety of connectors and fasteners that require human dexterity and flexibility to handle correctly. Conventional guarding technology, however, is insufficiently flexible and adaptable to allow this type of collaboration. Therefore, these situations are typically resolved either by automating aspects of the task best performed by a human, often at great expense and complication, or using a human worker to perform aspects of the task better done by a robot or machine (perhaps using additional equipment such as lift-assist devices) and tolerating potentially slow, error-prone, and inefficient execution that may lead to repetitive stress injuries or exposure to hazardous situations for human workers.

Although improved guarding based on 3D sensing may enable industrial engineers to design processes where each subset of the task is optimally assigned to a human or a machine without sacrificing the safety of human workers, several challenges inherently exist in using the 3D sensors in a safety-critical environment. First, the sensor itself must meet functional safety standards. In addition, the raw output of a 3D sensor cannot be used directly in most applications since it is much richer and harder to analyze than the data provided by 2D sensors. 3D sensor data thus requires processing in novel ways to generate effective and reliable control outputs for industrial machinery. Another challenge with systems based on 3D data is the difficulty in configuring and registering the systems and 3D sensors. In fact, even with 2D sensors, configuring safety guarding can be challenging. First, specific zones are usually designed and configured for each use case, taking into account the specific hazards posed by the machinery, the possible actions of humans in the workspace, the workspace layout, and the location and field of view of each individual sensor. It can be difficult to calculate the optimal shapes of exclusion zones, especially when trying to preserve safety while maximizing available floor space and system throughput.

Thus, configuring guarding technology requires advanced skill sets or tools. Mistakes in the configuration can result in serious safety hazards, requiring significant overhead in design and testing. All of this work must be completely redone if any changes are made to the workspace. The extra degree of freedom presented by 3D systems/sensors results in a much larger set of possible configurations and hazards, thereby requiring higher levels of data processing in order to generate useful, reliable control outputs from raw 3D sensor data. Accordingly, there is a need for approaches that reliably monitor a workspace for providing human safety to operate around the machinery, while reducing the required processing time and complexity of the data acquired by the 3D sensors.

SUMMARY

Various embodiments of the present teaching provide systems and methods for monitoring a workspace for safety purposes using 3D sensors that are registered with respect to each other and with respect to one or more pieces of machinery under control. As used herein, the term "register" refers to the process of estimating the relative pose of an object (e.g., a sensor) with respect to one or more other objects (e.g., a robot, the floor, other sensors, etc.). The goal of "registration" is to specify this relationship in terms of a rigid-body transformation with respect to a reference frame.

Registration among the sensors may be established based on one or more 3D images of the workspace acquired by the sensors when there is sufficient overlap and/or distinction between the acquired images. For example, conventional computer-vision techniques (e.g., global registration algorithms) and a fine registration approach (e.g., an ICP algorithm) may be implemented to perform registration among the sensors. If there is insufficient overlap between the fields of the sensors and/or insufficient details in the workspace are provided in the acquired images, one or more registration objects having distinctive signatures in 3D may be utilized for sensor registration. Alternatively, each sensor may record images of one or more people, moving equipment or other registration object(s) standing in the workspace or passing throughout the workspace over a period of time; when a sufficient number of at least partially matching images are acquired, the images may be combined and processed to establish the sensor registration. After the sensor registration is complete, a common reference frame of the sensors may then be transformed to a global reference frame of the workspace such that the data acquired by the sensor can be processed in the global frame.

In various embodiments, after the sensors are registered among themselves, the sensors are registered to machinery in the workspace. The registration can be established using the machinery and/or a registration target having a distinctive 3D signature and a related pose with respect to the machinery. The object used as a registration target may have on or in proximity thereto a source of information specifying the location of the object, the pose of the object, or both. For example, this information may be machine-readable by optical capture (e.g., a barcode) or using a reader (such as a reader that acquires information from an RFID tag affixed to or near the registration object).

In one approach, the sensors may first register to the registration target using the acquired information; and then based on this registration and the related pose of the registration target to the machinery, the sensors may register to the machinery. In some embodiments, an image of the scene in the workspace viewed by the sensors is provided on a user interface. In addition, a 2D or 3D model of the machinery and/or the workspace created using computer-aided design (CAD) and/or scanning of the actual machinery and/or workspace may be displayed on the image of the scene. One or more pairs of discrete features and/or constraints in the image of scene may then be selected manually by the operator or automatically by a control system to establish the registration between the sensors and the machinery. In various embodiments, automated registration of the sensors to the machinery involves use of a registration library including one or more configuration parameters (e.g., a number of iterations for fine-tuning the registration, a 3D point cloud density, mesh density, one or more convergence criteria, etc.) that are established in previous setups of the sensors and machinery in the workspace. In one embodiment, the state of the robot(s) and/or machinery in the image of the scene is compared against that of the robot(s) and/or machinery in the stored images of the scene in the registration library; an image that provides the best matching state in the registration library can be identified. Subsequently, the configuration parameter(s) associated with the best-matched state in the image of the scene can be retrieved, and based thereon, registration of the sensors to the machinery may be established.

During operation of the machinery, registration among sensors and between the sensors and machinery can be continuously monitored in real time. For example, a set of metrics (e.g., registration validation, real-time robot tracking, etc.) capturing the fit accuracy of the observed data to a model of static elements in the workspace may be created during the registration process. Upon completion of the registration and as the system operates, the metrics may be continuously monitored and updated in real time. If the metrics or deviations thereof from their initial values (i.e., obtained during initial registration) exceed a specified threshold, the registration during the system operation may be considered to be invalid and an error condition may be triggered. Subsequently, the machinery under operation may be shut down or transitioned to a safe state. In addition, the signals acquired by the sensors during operation of the machinery may be continuously analyzed. If the sensors remain in position but the fields of view are obscured or blocked, and/or the measured sensor signals are degraded, the machinery may be transitioned to a safe state as well. Accordingly, various embodiments provide approaches that reliably monitor the workspace for providing human safety to operate around the machinery.

Accordingly, in one aspect, the present teaching relates to a method of ensuring safe operation of industrial machinery in a workcell, which includes at least one object having on or in proximity thereto a source of information specifying at least one of a location of the object or a pose of the object. In various embodiments, the method comprises the steps of disposing a plurality of image sensors proximate to the workcell and acquiring, with at least some of the image sensors, a plurality of images of the workcell; acquiring at least one of location or pose information of at least one object in the workcell appearing in at least one of the images; and registering the sensors to each other and to the workcell based at least in part on the plurality of images and the acquired information.

In some embodiments, the information is acquired by a first one of the sensors and propagated electronically to the other sensors. The information may be optical (e.g., a barcode) and detected by at least one of the sensors along a line of sight. Alternatively, or in addition, the information may be electromagnetic. For example, the source of information may be passive (e.g., an RFID tag or a retroreflective tag) and the information may be detected by at least one reader emitting electromagnetic energy. Alternatively, the source of information emits an electromagnetic signal for detection by at least one reader. The electromagnetic signal may, for example, be optical or radiofrequency.

In another aspect, the present teaching pertains to a registration object for facilitating registration among sensors distributed about a workspace. In various embodiments, the registration object comprises a body portion including at least one asymmetric feature; and affixed or in close proximity to the body portion, a source of optically or electronically readable information specifying a location and a pose of the object. The information may be detectable by an optical sensor along a line of sight, e.g., it may be a barcode. Alternatively, or in addition, the information may be detectable by at least one reader emitting electromagnetic energy, and the source of information may be responsive to an interrogation signal; e.g., the source of information may be a passive RFID tag or a retroreflective tag. In some cases, the source of information may emit an electromagnetic signal for detection by at least one reader.

Some embodiments described herein are directed to systems and methods for sensor registration for a workcell including a floor.

In one embodiment, a method for sensor registration for a workcell including a floor is disclosed. The method comprises: disposing a plurality of three dimensional (3D) image sensors proximate to the workcell; acquiring, with the plurality of 3D image sensors, a plurality of 3D images of the workcell, wherein at least one of the plurality of 3D images includes at least a portion of the floor; determining, based on a first user selection of a region of a first image of the plurality of 3D images of the workcell, a first floor point indicating a first portion of the floor in the first image; computing a first floor plane representing the floor based on the first floor point; and registering the 3D image sensors to each other and to the workcell based at least in part on the plurality of 3D images and the first floor plane.

In another embodiment, a control system for sensor registration for a workcell including a floor is disclosed. The control system comprises: a plurality of three-dimensional (3D) image sensors proximate to the workcell; and a controller. The controller is configured to: cause the plurality of 3D image sensors to acquire a plurality of 3D images of the workcell, wherein at least one of the plurality of 3D images includes at least a portion of the floor; determine, based on a first user selection of a region of a first image of the plurality of 3D images of the workcell, a first floor point indicating a first portion of the floor in the first image; compute a first floor plane representing the floor based on the first floor point; and register the 3D image sensors to each other and to the workcell based at least in part on the plurality of 3D images and the first floor plane.

As used herein, the term "substantially" means ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the drawings, like reference characters generally refer to the same parts throughout the different views. Also, the drawings are not necessarily to scale, with an emphasis instead generally being placed upon illustrating the principles of the present teaching. In the following description, various embodiments of the present teaching are described with reference to the following drawings, in which.

DETAILED DESCRIPTION

A. Workspace

Figure 1:
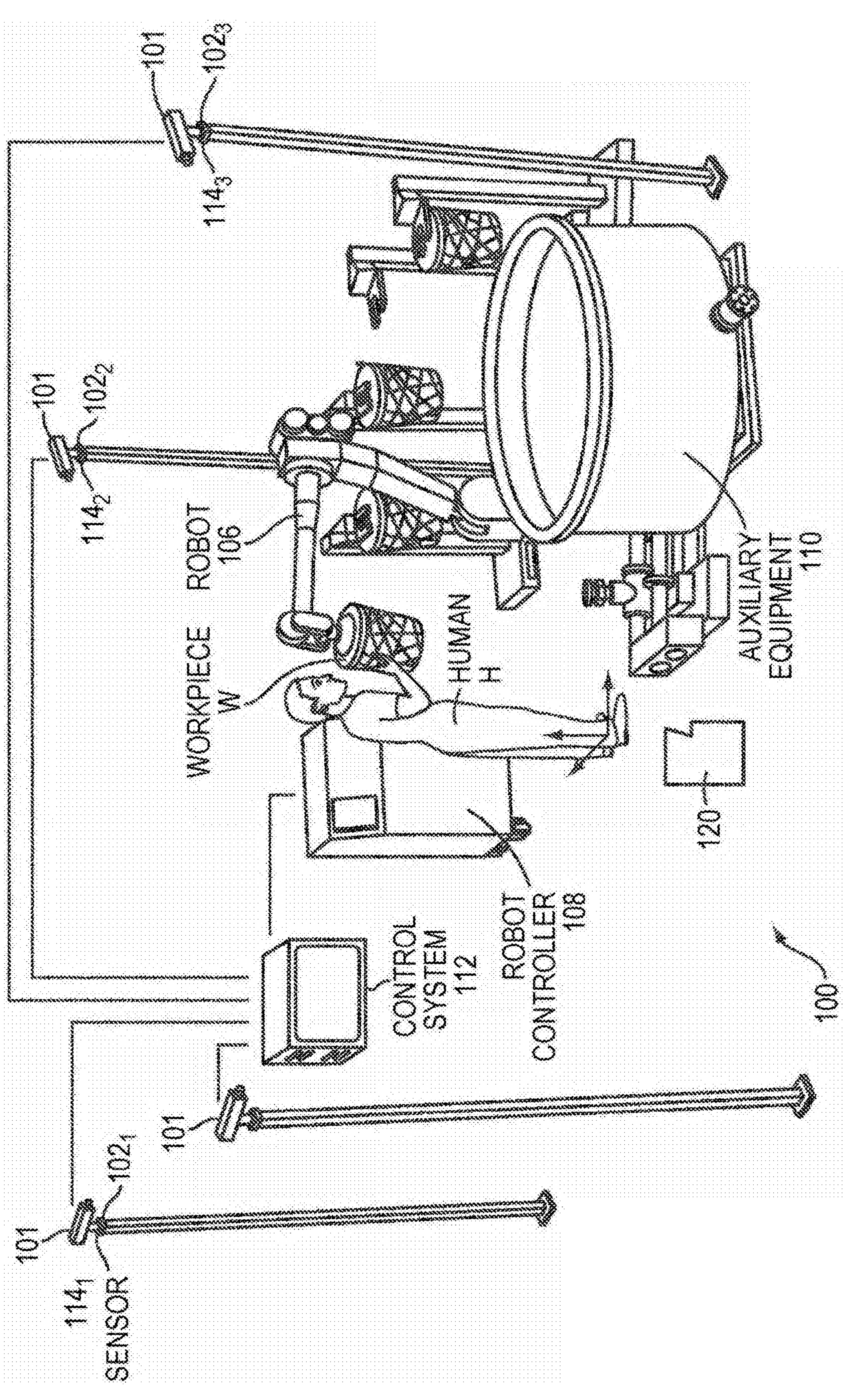
FIG. 1 is a perspective view of a monitored workspace, in accordance with various embodiments of the present teaching.

Refer first to FIG. 1, which illustrates a representative 3D workspace 100 monitored by a sensor system 101 including one or more sensors representatively indicated at $\mathbf{102}_1$, $\mathbf{102}_2$, $\mathbf{102}_3$. The sensors $\mathbf{102}_{1\text{-}3}$ may be conventional optical sensors such as cameras, e.g., 3D time-of-flight cameras, stereo vision cameras, or 3D LIDAR sensors or radar-based sensors, ideally with high frame rates (e.g., between 30 Hz and 100 Hz). The mode of operation of the sensors $\mathbf{102}_{1\text{-}3}$ is not critical so long as a 3D representation of the workspace 100 is obtainable from images or other data obtained by the sensors $\mathbf{102}_{1\text{-}3}$. As shown in the figure, sensors $\mathbf{102}_{1\text{-}3}$ may collectively cover and can monitor the workspace 100, which includes a robot 106 controlled by a conventional robot controller 108. The robot 106 interacts with various workpieces W, and a human operator H in the workspace 100 may interact with the workpieces W and the robot 106 to perform a task. The workspace 100 may also contain various items of auxiliary equipment 110. As used herein the robot 106 and auxiliary equipment 110 are denoted as machinery in the workspace 100.

In various embodiments, data obtained by each of the sensors $\mathbf{102}_{1\text{-}3}$ is transmitted to a control system 112. In addition, the sensors $\mathbf{102}_{1\text{-}3}$ may be supported by various software and/or hardware components $\mathbf{114}_{1\text{-}3}$ for changing the configurations (e.g., orientations and/or positions) of the sensors $\mathbf{102}_{1\text{-}3}$; as further described below, the control system 112 may be configured to adjust the sensors so as to provide optimal coverage of the monitored area in the workspace 100. The volume of space covered by each sensor—typically a solid truncated pyramid or solid frustum may be represented in any suitable fashion, e.g., the space may be divided into a 3D grid of small (5 cm, for example) cubes or "voxels" or other suitable form of volumetric representation. For example, a 3D representation of the workspace 100 may be generated using 2D or 3D ray tracing, where the intersections of the 2D or 3D rays emanating from the sensors $\mathbf{102}_{1\text{-}3}$ are used as the volume coordinates of the workspace 100. This ray tracing can be performed dynamically or via the use of precomputed volumes, where objects in the workspace 100 are previously identified and captured by the control system 112. For convenience of presentation, the ensuing discussion assumes a voxel representation, and the control system 112 maintains an internal representation of the workspace 100 at the voxel level.

Figure 2:
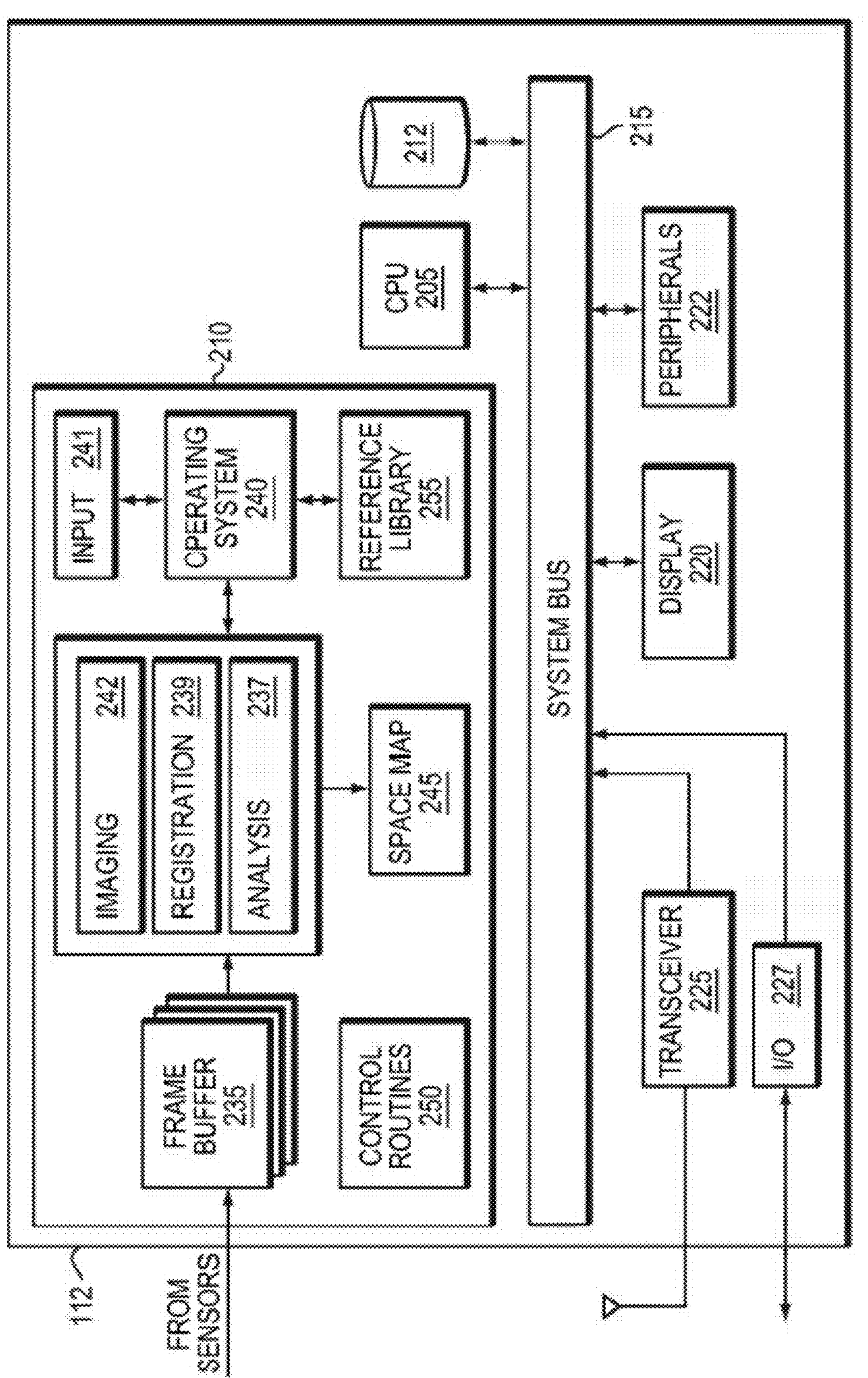
FIG. 2 schematically illustrates a control system, in accordance with various embodiments of the present teaching.

FIG. 2 illustrates, in greater detail, a representative embodiment of the control system 112, which may be implemented on a general-purpose computer. The control system 112 includes a central processing unit (CPU) 205, system memory 210, and one or more non-volatile mass storage devices (such as one or more hard disks and/or optical storage units) 212. The control system 112 further includes a bidirectional system bus 215 over which the CPU 205, functional modules in the memory 210, and storage device 212 communicate with each other as well as with internal or external input/output (I/O) devices, such as a display 220 and peripherals 222 (which may include traditional input devices such as a keyboard or a mouse). The control system 112 also includes a wireless transceiver 225 and one or more I/O ports 227. The transceiver 225 and I/O ports 227 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with the control system 112 using a tablet that wirelessly joins the network. When used in a WAN networking environment, computers typically include a modem or other communication mechanism. Modems may be internal or external and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, ZigBee, IrDa, near-field communication (NFC), or other suitable protocol. Furthermore, components of the system may communicate through a combination of wired or wireless paths, and communication may involve both computer and telecommunications networks.

The CPU 205 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the present teaching.

The system memory 210 may contain a series of frame buffers 235, i.e., partitions that store, in digital form (e.g., as pixels or voxels, or as depth maps), images obtained by the sensors $\mathbf{102}_{1\text{-}3}$; the data may actually arrive via I/O ports 227 and/or transceiver 225 as discussed above. The system memory 210 contains instructions, conceptually illustrated as a group of modules, that control the operation of CPU 205 and its interaction with the other hardware components. An operating system 240 (e.g., Windows or Linux) directs the execution of low-level, basic system functions such as memory allocation, file management and operation of the mass storage device 212. At a higher level, and as described in greater detail below, an imaging module 242 may register the images acquired by the sensors in the frame buffers 235; an analysis module 237 may analyze the images acquired by the sensors $\mathbf{102}_{1\text{-}3}$ to determine, for example, whether there is sufficient overlap and/or distinction between the acquired images and/or the coverage area monitored by the sensors $\mathbf{102}_{1\text{-}3}$; a registration module 239 may register the sensors among themselves based on the images registered in the frame buffers 235 and/or register the sensors $\mathbf{102}_{1\text{-}3}$ to the machinery in the workspace as further described below; and an input module 241 for receiving one or more external input data from, for example, the display 220, the peripherals 222, the robot controller 108 and/or additional sensors (e.g., other than the sensors $\mathbf{102}_{1\text{-}3}$) for identifying a state (e.g., an orientation, a position, etc.) of the robot 106 and/or one or more registration objects as further described below. The determined coverage area may be stored in a space map 245, which contains a volumetric representation of the workspace 100 with each voxel (or other unit of representation) labeled, within the space map, as described herein. Alternatively, the space map 245 may simply be a 3D array of voxels, with voxel labels being stored in a separate database (in memory 210 or in mass storage 212).

In addition, the control system 112 may communicate with the robot controller 108 to control the operation or machinery in the workspace 100 using conventional control routines collectively indicated at 250. As explained below, the configuration of the workspace may well change over time as persons and/or machines move about; the control routines 250 may be responsive to these changes in operating machinery to achieve high levels of safety. All of the modules in system memory 210 may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, or Theano. Additionally, the software can be implemented in an assembly language and/or machine language directed to the microprocessor resident on a target device.

B. Sensor Registration and Monitoring

The sensor system 101 is implemented to monitor the workspace 100, and the guarding mechanism is generally configured with respect to dangerous machinery (e.g., the robot 106), as opposed to the sensors $\mathbf{102}_{1\text{-}3}$. In a multi-sensor system, a registration among the sensors $\mathbf{102}_{1\text{-}3}$ that correlates the precise location of each sensor 102 with respect to all other sensors is typically established during setup and/or during operation of the machinery. In one embodiment, the sensor registration is performed manually. For example, the human operator H may measure distances between the focal points of the sensors and the machinery being controlled in three dimensions and manually manipulate the poses (e.g., positions and/or orientations) of the sensors $\mathbf{102}_{1\text{-}3}$ based thereon so as to provide an optimal coverage area in the workspace 100. Additionally, or alternatively, a user interface shown in the display 220 may, for example, provide alignment points of the sensors $\mathbf{102}_{1\text{-}3}$ and a signal to indicate optimal sensor positioning to maximize signal quality and reliability, determine and display metrics for registration reliability and safety signals, and provide user feedback. The operator H may then adjust the pose of the sensor $\mathbf{102}_{1\text{-}3}$ based on the user feedback. While it is possible for sensor registration to be achieved manually, it may be burdensome even for a single sensor, and unrealistic for providing sufficiently accurate measurements to combine information from multiple sensors. Therefore, in various embodiments, the sensor registration is performed automatically using suitable computer-vision techniques. As further described below, approaches for registering multiple sensors $\mathbf{102}_{1\text{-}3}$ in the workspace 100 are sufficiently simple so as to allow for ease of setup and reconfiguration.

1) Registration Among Sensors

Assuming for simplicity that each frame buffer 235 stores an image (which may be refreshed periodically) from a particular sensor 102, the registration module 239 may perform registration among the sensors $\mathbf{102}_{1\text{-}3}$ by comparing all or part of the image from each sensor to the images from other sensors in the frame buffers 235, and using conventional computer-vision techniques (e.g., global-registration algorithms) to identify correspondences in those images. Suitable global-registration algorithms, which do not require an initial registration approximation, generally fall into two categories: feature-based methods and intensity-based methods. Feature-based methods, such as random sample consensus (RANSAC), may extract features (e.g., edges) in the images and then identify correspondences based on the extracted image features; intensity-based methods may determine image intensities in the images and then use correlation metrics to compare the intensity patterns. Once an approximate or gross registration is performed, a fine registration approach (e.g., an iterative closest point (ICP) algorithm or suitable variant thereof) may be performed to fine-tune the registration and complete the sensor registration among themselves. Thereafter, the data acquired by the sensors $\mathbf{102}_{1\text{-}3}$ can be processed in a common reference frame (e.g., in the same coordinate system) based on the registration.

In various embodiments, the common reference frame of the sensors $\mathbf{102}_{1\text{-}3}$ is transformed to a "global" frame (e.g., a coordinate system) of the workspace 100. For example, to convert the images acquired by the sensors $\mathbf{102}_{1\text{-}3}$ in a common 2D frame to 3D data in the global frame of the workspace 100, a 2D range image in the frame buffer 235 may be transformed to a sensor-local 3D coordinate system by undistorting the image coordinates of each range pixel and applying an inverse projection transformation to the undistorted image coordinates and a range measurement. This generates a structured point cloud in the sensor-local coordinate system, which may be transformed using a suitable rigid-body transformation. Referring again to FIG. 1, in one embodiment, the transformation is determined using one or more "registration objects" 120 having distinctive visual signatures in 3D. For example, the registration object(s) may be placed in a location within the workspace where it can be seen by all sensors or at least one sensor that is registered with respect to the others. By acquiring images of the registration object(s) using the registered sensor(s) $\mathbf{102}_{1\text{-}3}$ and based on the known signature(s) and/or geometries of the registration object(s), the transformation that transforms data in the common frame of the sensors $\mathbf{102}_{1\text{-}3}$ to the data in the global frame of the workspace 100 may be computed. Thereafter, the data acquired by the sensors $\mathbf{102}_{1\text{-}3}$ can be processed in the global frame of the workspace 100.

The above-described approaches for sensor registration are suitable when there is sufficient overlap between the fields of view of the sensors $\mathbf{102}_{1\text{-}3}$ and sufficient visual detail in the workspace 100 to provide distinct sensor images. If, however, there is insufficient overlap between the fields of the sensors $\mathbf{102}_{1\text{-}3}$ and/or insufficient detail in the workspace 100, use of one or more registration objects 120 having distinctive signatures in 3D may be necessary to facilitate sensor registration. For example, each sensor 102 may be first separately registered to the registration object(s); registration among the sensors $\mathbf{102}_{1\text{-}3}$ may then be established based on the registration between each sensor 102 and the registration object(s) 120. As used herein, the term "distinctive 3D signature" refers to a uniquely identifiable position and pose (and so free of rotational or translational symmetry), e.g., presenting a detectably different profile when viewed from different angles. For example, while a single cube has six potential orientations, two cubes at a known distance and non-collinear orientation with respect to each other may provide sufficient information for a distinctive 3D signature. More generally, the registration object(s) may include, for example, fiducials or other 2D or 3D objects, and may be stationary or carried around by the human operator H and/or machinery (e.g., on the robot) in the guarded workspace 100.

Alternatively, registration among the sensors $\mathbf{102}_{1\text{-}3}$ may be achieved by having each of the sensors $\mathbf{102}_{1\text{-}3}$ record images of one or more people, moving equipment (such as automated guided vehicles) or other registration object(s) 120 standing in the workspace or passing through the workspace over a period of time; when a sufficient number of at least partially matching images are acquired, the images may be combined and processed to establish an accurate sensor registration using the approaches described above.

Occasionally, the data collected from the sensors $\mathbf{102}_{1\text{-}3}$ may be noisy or optically distorted; thus, in some embodiments, suitable techniques, such as sub-frame combination, noise reduction, meshing and resampling, etc. may be implemented to minimize (or at least reduce) the noise inherent in the sensor signals, thereby improving accuracy of sensor registration. In addition, the detected sensor signals may be corrected using conventional approaches based on average or distribution estimation so as to maintain sensor alignment. In one embodiment, the noise and distortion correction process bounds the errors inherent in the detected signals and registration process. The error bounds can be used as inputs to the control system 112 during operation of the robot 106 to ensure human safety. For example, if the noise or distortion of the signals detected by the sensors $\mathbf{102}_{1\text{-}3}$ during operation of the robot 106 exceeds the error bounds and/or the robotic system drifts outside the error bounds during operation, the control system 112 may automatically communicate with the robot controller 108 so as to switch the machinery in the workspace 100 to a safe state (e.g., having a reduced speed or being deactivated).

In various embodiments, a global-optimization algorithm is implemented to estimate the optimal configuration or pose of each sensor in the coordinate system of the workspace 100 by minimizing a global error metric. The use of a global optimization algorithm ensures the best sensor configuration estimate regardless of the initial configuration or estimates thereof. For example, given a set of correspondences, one common approach is to minimize the sum of pairwise (typically Euclidean) distances. In such cases the cost for optimization purposes is taken as the distance. Other distance-based costs such as "Hausdorff" distance are common for alignment tasks. Where no correspondences can be identified, these may be estimated through refinement of a good guess using nearest neighbor or projections into depth images. Global pose estimation without correspondences is more challenging and the cost function becomes more abstract, e.g., a search for viable poses via branch-and-bound algorithms or sampling of point sets to find minimal functioning correspondence sets using, e.g., the RANSAC algorithm or similar approaches.

Figure 3:
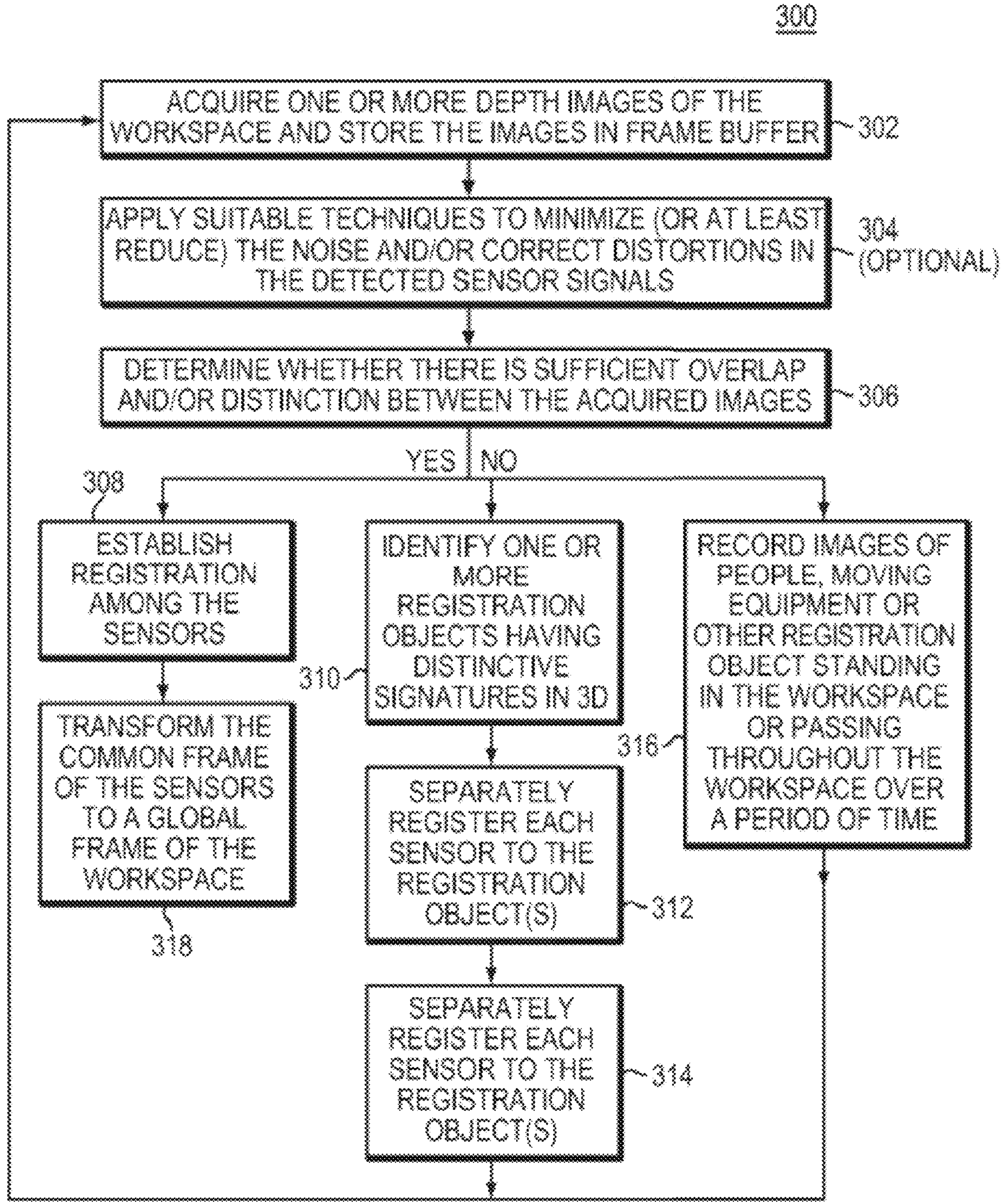
FIG. 3 is a flow chart illustrating an approach for registering sensors among themselves, in accordance with various embodiments of the present teaching.

FIG. 3 is a flow chart illustrating an exemplary approach 300 for registering sensors among themselves. In a first step 302, each of the sensors $\mathbf{102}_{1\text{-}3}$ may acquire one or more images of the workspace; the images may be stored in the frame buffer 235 in memory 210. In a second step 304, suitable techniques may be optionally implemented to minimize (or at least reduce) the noise and/or correct distortions in the detected sensor signals. In a third step 306, the analysis module 237 may analyze the images to determine whether there is sufficient overlap and/or distinction between the acquired images. If so, the registration module 239 may implement conventional computer-vision techniques (e.g., global registration algorithms) and a fine registration approach (e.g., an ICP algorithm) to establish registration among the sensors $\mathbf{102}_{1\text{-}3}$ (step 308). If there is insufficient overlap between the fields of the sensors $\mathbf{102}_{1\text{-}3}$ and/or insufficient details in the workspace 100, one or more registration objects 120 having distinctive signatures in 3D may be identified (step 310). Each sensor 102 may be first separately registered to the registration object(s) (step 312). Subsequently, the registration among the sensors $\mathbf{102}_{1\text{-}3}$ may then be established based on the registration between each sensor 102 and the registration object(s) 120 (step 310). Alternatively, each sensor may record images of one or more people, moving equipment or other registration object(s) 120 standing in the workspace or passing throughout the workspace over a period of time (step 314). When a sufficient number of at least partially matching images are acquired, the images may be combined and processed to establish an accurate sensor registration (step 316). Optionally, after registration, the common reference frame of the sensors $\mathbf{102}_{1\text{-}3}$ may be transformed to a global frame of the workspace 100 (step 318).

In some embodiments, registration using a registration object 120 is assisted by a passive or active information tag 120*t* associated with the object. In general, the tag 120*t* is affixed to the object or to a platform supporting the object (e.g., a table or pedestal supporting a robot arm), or is located close enough to the object (e.g., within a few centimeters) that the information will be accurate for registration purposes. Tag information may specify the location of the object 120 in space (e.g., in absolute coordinates as determined by, for example, GPS or a facility-wide location monitoring system) and may, in some instances, specify a pose of the object. For example, suppose the registration object 120 is a robot arm. The tag 120*t* may contain an identifier for the robot arm and its joint angles, enabling a computer vision system to computationally align an image of the object obtained with one sensor to an image obtained by a different sensor from a different perspective, based on the provided pose and identifier information. The identifier may be used to look up the object's size and geometry to help resolve the alignment. The geometric transformation producing alignment between images from different sensors also represents the registration between those sensors.

The information on the tag 120*t* may be active or passive, i.e., it may be broadcast or may instead be acquired by a reader. Examples of passive tags include optically detectable indicia such as barcodes; as used herein, the term "barcode" includes 1D and 2D barcodes, QR codes, retroreflective labels, and similar optically readable indicia. A barcode tag 120*t* may be read by the sensors 101 along their lines of sight; and since the sensors 101 are generally distributed around the workspace 100, the object 120 may include a plurality of tags 120*t* so that all sensors 101 have a line of sight to the encoded information. Alternatively, the sensors may communicate so that when one sensor 101 obtains tag information, it propagates the information to the other sensors 101.

Passive tags 120*t* may be readable electromagnetically rather than optically. For example, the tag may be a passive radio frequency identification (RFID) or transponder circuit whose operation is powered by energy delivered by a reader. In some embodiments, the reader emits an interrogation signal that "wakes up" the RFID and causes it to impart the information, e.g., by a time-varying response to the interrogation signal.

While passive tags are typically detected and read by the sensors 101, active tags emit an electromagnetic signal for detection by one or more readers that may be located anywhere in the workspace 100—in the sensors 101, in the control system 112, or implemented as a standalone unit in communication with the control system 112. An active tag 120*t* may include an onboard power source, such as a battery, and may emit an optical (e.g., visible, infrared or ultraviolet) or RF signal. An optical signal requires a line of sight to the reader, and once again, if sensors 101 are configured to detect and interpret the signal, any sensor that has done so may share the information with the other sensors.

2) Registration of Sensors to Machinery

Registration of the sensors $\mathbf{102}_{1\text{-}3}$ to the machinery under control in the workspace 100 can, in some cases, be achieved without any additional instrumentation, especially when the machinery has a distinctive 3D signature (e.g., a robot arm) and/or when the machinery is visible to at least one sensor 102 that is registered with respect to the other sensors as described above. The sensor(s) 102 to which the machinery is visible may first register to the machinery; based on this registration and the registration among the sensors $\mathbf{102}_{1\text{-}3}$, other sensors to which the machinery is invisible may then register to the machinery. Alternatively, a registration target (e.g., the registration object 120 having a distinctive 3D signature) in the workspace 100 may be utilized to register the sensors $\mathbf{102}_{1\text{-}3}$ to the machinery. Generally, the registration target is specially designed such that it is straightforward for the human operator H to determine the pose of the registration target with respect to the machinery. Again, the sensors $\mathbf{102}_{1\text{-}3}$ may then be registered to the machinery via registration of the sensors $\mathbf{102}_{1\text{-}3}$ to the registration target and the pose of the registration target relative to the machinery.

In various embodiments, the user interface shown on the display 220 may provide an image of the scene in the workspace 100 to allow the human operator H to manually designate certain parts of the image as key elements of the machinery under control. The registration of the sensors 102$_{1-3}$ to the machinery may then be performed using the user-designated key elements. The image of the scene may include the actual scene viewed by the sensors 102$_{1-3}$ or one or more additional sensors (e.g., RGB cameras) employed in the workspace 100. In addition, the image of the scene may include visible 3D point cloud data mapping the workspace 100. In one embodiment, the image of the scene includes geometry of at least a portion of the registration target. For example, the geometry may include a 2D or 3D CAD model of the machinery (e.g., the robot) and/or the workspace 100. Additionally, or alternatively, the geometry may include a model of the actual machinery and/or workspace constructed based on a 2D and/or 3D scan captured by the sensors 102$_{1-3}$ (and/or other similar sensors), machinery or other equipment in the workspace 100. In cases where the robot 106 and/or other machinery controlled by the robot controller 108 is used as the registration target, the position of the robot and/or other machinery in the workspace 100 received and determined by the robot controller 108 may be combined with the CAD model thereof to obtain the fully posed geometry corresponding to the state of the workspace 100. In addition, the robot controller 108 and/or the control system 112 may continuously monitor the position of the robot and/or other machinery to ensure that no undesirable movement occurs while the scan data are acquired and accumulated.

The CAD model may be imprecise; thus, in some embodiments, various suitable techniques can be implemented to improve fit and quality of the CAD model. For example, floors and walls outside of a workcell (enclosing, for example, the machinery under control and the human operator H) in the workspace 100 may be excluded from the image of the scene and/or the CAD model to improve the registration accuracy. In one embodiment, the CAD model is simplified by taking out or deleting extraneous model components that do not contribute to registration; alternatively, the CAD model may be simplified into its minimum components, such as a stick figure. In some embodiments, the data acquired by the sensors 102$_{1}{}^{3}$ can be used to improve the accuracy of the 2D or 3D CAD model by incorporating, for example, robot dress packages and/or end effectors as part of the model. In one embodiment, the 2D or 3D CAD model can also be overlaid on top of the point cloud data or visual image acquired by the sensors 102$_{1-3}$ on the user interface shown on the display 220 as an alignment aid.

It should be noted that the geometry of the machinery used for registration is not necessarily the same one used for collision avoidance. Typically, collision geometry includes cabling and a dress package associated with the machinery and is biased towards inclusion for safety. On the other hand, registration geometry is unbiased, with different resolution and precision requirements, excludes non-rigid regions, and may have to exclude regions that provide unreliable measurements (e.g., dark or overly reflective surfaces or components that are thin and hard to measure). As described above, in some embodiments, the registration geometry of the registration target and/or workcell is constructed by scanning the actual registration target and/or workcell using the same or similar sensors as the ones that are used to perform registration (as opposed to the CAD model). This may lead to more reliable reference geometry that is not subject to deviations between the CAD model and the actual manufactured parts of the robot, whether intended or accidental.

The alignment/registration of the sensor system 101 to the machinery can be performed manually through the user interface. For example, the user may use a keyboard input, a mouse, a joystick or other suitable tools to specify the pose of each sensor, a group of sensors with known poses with respect to each other and/or with respect to the machinery shown on the display 220. This process can be automated or semi-automated. Yet another option to perform the alignment/registration is to select pairs of discrete features in the depth image and on the robot 106 shown on the user interface on the display 220, followed by an automated or semi-automated refinement step. For example, the human operator H or the registration module 239 may introduce a constraint by picking a single pair of features, and then trigger automatic registration of the sensor system 101 to the machinery in the presence of the constraint (i.e., ensuring the constraint to be satisfied); the constraint may improve reliability of the registration. In some embodiments, two constraints are added manually by the operator H or automatically by the registration module 239; this may further restrict the search space and make the automatic registration even more robust. Selecting three pairs of features may allow skipping a search for coarse feature correspondences, and instead going directly to the refinement step (such as using the ICP algorithm discussed above), thereby providing a reliable and accurate registration.

Referring again to FIG. 2, in various embodiments, automated registration of the sensors 102$_{1-3}$ to the machinery involves use of a reference library or registration library 255; the registration library 255 includes one or more configuration parameters (such as a number of iterations for fine tuning the registration, a number of 3D point cloud data per mesh, one or more convergence criteria, etc.) that are established in previous setups of the sensor system 101 and machinery in the workspace 100. Typically, each configuration parameter in the registration library 255 is established for a particular spatial arrangement of one or more specific robots 106, machinery, hardware configuration, and/or sensors 102$_{1-3}$ in the workspace 100, and is stored along and in association with the respective image of the scene in the memory 210. In one embodiment, the control system 112 (e.g., the registration module 239) automatically compares the state (e.g., the orientation, position, etc.) of the robot(s) and/or machinery in the image of the scene against that of the robot(s) and/or machinery in the stored images of the scene in the registration library 255 and then identifies a stored image that provides the best matching state. The control system 112 (e.g., the registration module 239) may then retrieve the configuration parameter(s) associated with the best-matched state in the image of the scene, and based thereon, perform automated registration of the sensors 102$_{1-3}$ to the machinery.

Occasionally, a single state of the robot or other machinery in the workspace 100 may not provide a registration target that adequately constrains all degrees of freedom (because, for example, not all sensors 102$_{1-3}$ can observe the robot 106 in its current configuration and/or the robot features observed by the sensors 102$_{1-3}$ are not sufficiently distinctive as described above); in various embodiments, the robot 106 and/or other machinery can be re-posed to one or more additional known states (e.g., the states that have been successfully set up previously for registration), either manually or automatically by the robot controller 108 and the control system 112 running a predetermined program. Data related to the state(s) of the robot 106 and/or other machinery and the data acquired by the sensors $\mathbf{102}_{1\text{-}3}$ during this procedure can be combined to provide a larger registration data set that provides a more reliable and precise registration. In one embodiment, the combined data may be compared against the data stored in the registration library 255 so as to allow automated registration of the sensors $\mathbf{102}_{1\text{-}3}$ to the machinery as described above. In addition, the data acquired during re-posing of the robot 106 and/or other machinery to the additional known state(s) may be stored in the registration library 255 for further comparison.

Figure 4A:
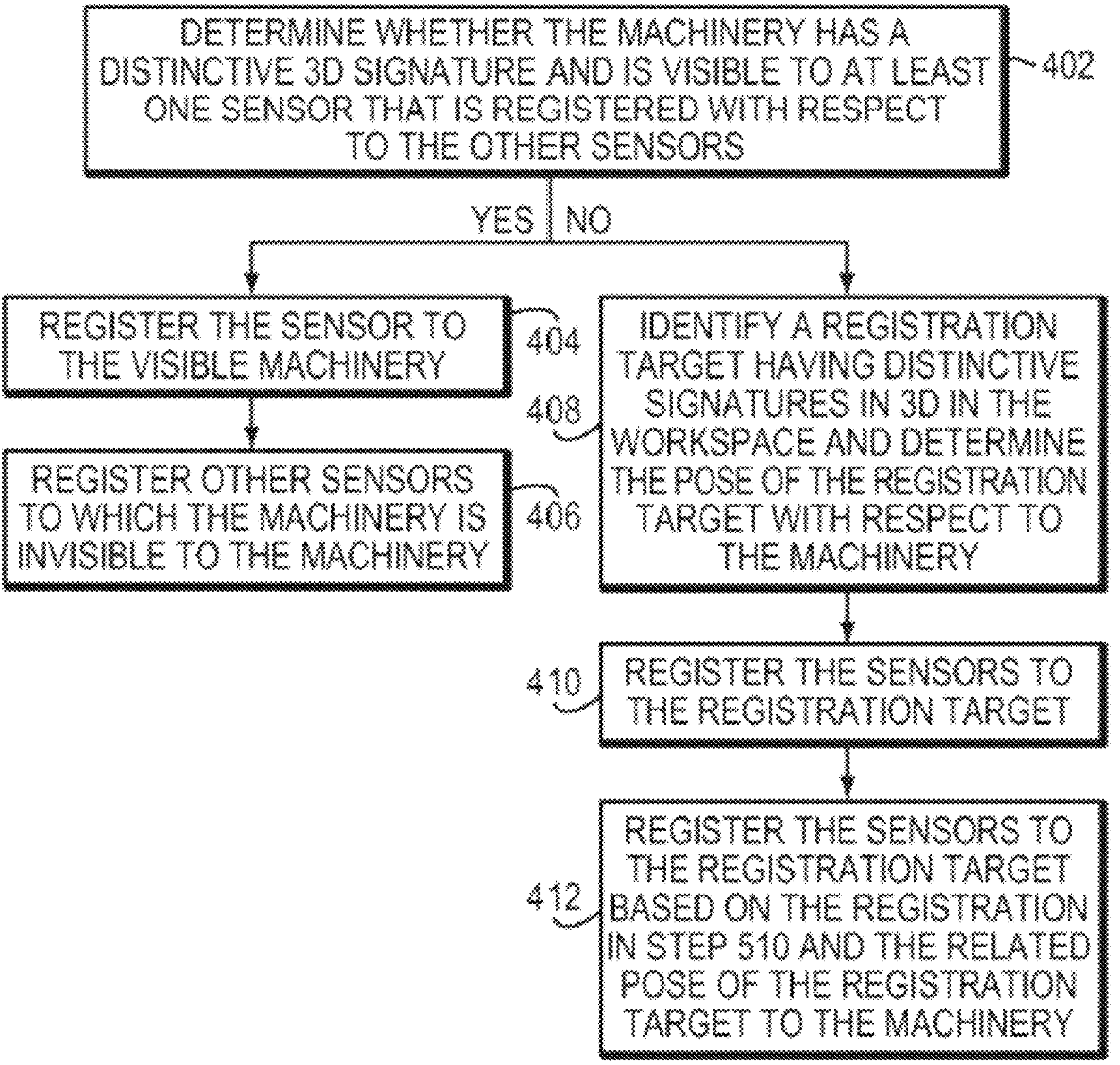
FIGS. 4A-4C are flow charts illustrating exemplary approaches for registering one or more sensors to machinery in a workspace, in accordance with various embodiments of the present teaching.
Figure 4B:
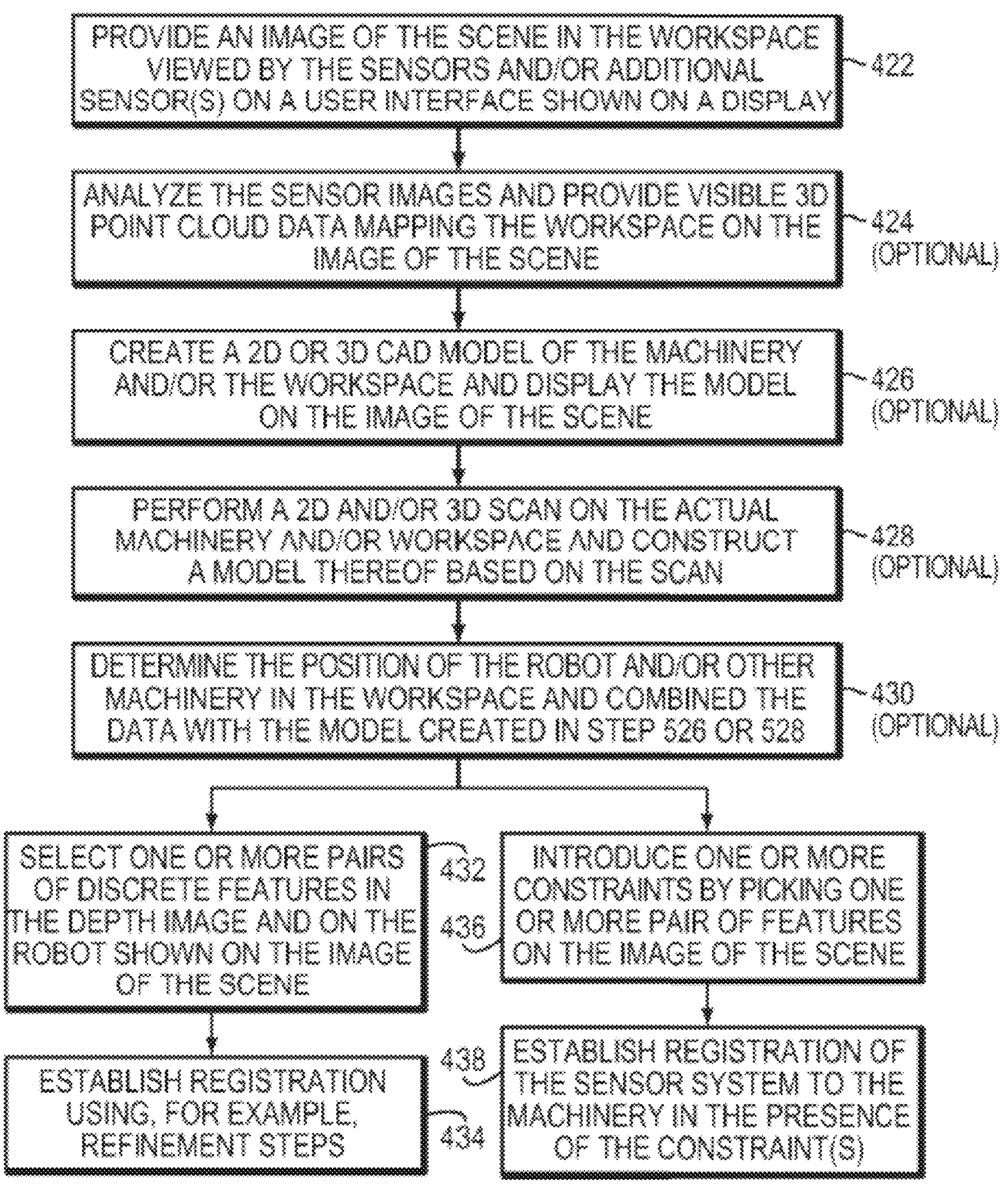
Figure 4C:
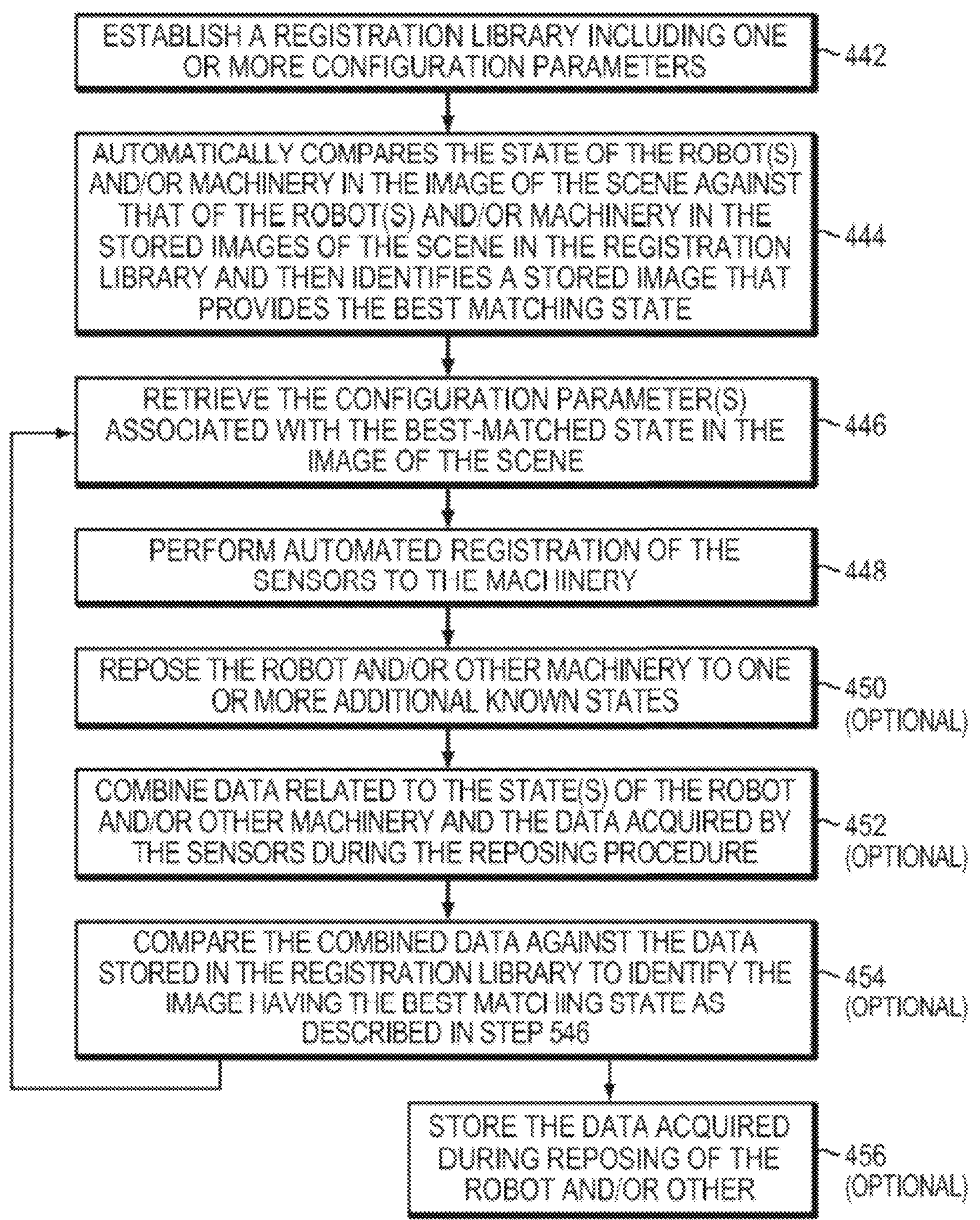

FIGS. 4A-4C are flow charts illustrating exemplary approaches for registering one or more sensors to machinery in a workspace. Referring first to FIG. 4A, in a first step 402, the machinery under control in the workspace is analyzed by, e.g., the control system 112, to determine whether it has a distinctive 3D signature and/or is visible to at least one sensor that is registered with respect to the other sensors. For example, if the images acquired by the sensors $\mathbf{102}_{1\text{-}3}$ indicate that the machinery does not have rotational or translational symmetry in at least one dimension (e.g., a different profile of the machinery is presented when being viewed from a different angle), the machinery is determined to have a distinctive 3D signature. If so, the registration module 239 may first register to the machinery the sensor(s) 102 to which the machinery is visible (step 404). Based on the registration performed in step 404 and the registration among the sensors $\mathbf{102}_{1\text{-}3}$, the registration module 239 may then register to the machinery other sensors to which the machinery is invisible (step 406). If the machinery does not have a distinctive 3D signature and/or is invisible to any sensors that are registered with respect to the other sensors, the registration module 239 may identify a registration target having distinctive signatures in 3D in the workspace (based on, for example, the images acquired by the sensor(s)) and determine the pose of the registration target with respect to the machinery (step 408). Subsequently, the registration module 239 may register the sensors $\mathbf{102}_{1\text{-}3}$ to the registration target (step 410) and based on the registration in step 410 and the related pose of the registration target to the machinery, register the sensors $\mathbf{102}_{1\text{-}3}$ to the registration target (step 412).

Alternatively, referring to FIG. 4B, in various embodiments, an image of the scene in the workspace 100 viewed by the sensors $\mathbf{102}_{1\text{-}3}$ and/or additional sensor(s) is provided on a user interface shown on the display 220 (step 422). Optionally, the analysis module 237 may analyze the sensor images and provide visible 3D point cloud data mapping the workspace 100 on the image of the scene (step 424). In addition, the control system 212 may create a 2D or 3D CAD model of the machinery and/or the workspace 100 and display the model on the image of the scene (step 426). Additionally, or alternatively, the sensors $\mathbf{102}_{1\text{-}3}$ (and/or other similar sensors), machinery or other equipment in the workspace 100 may perform a 2D and/or 3D scan on the actual machinery and/or workspace and construct a model thereof based on the scan (step 428). In one implementation, the position of the robot and/or other machinery in the workspace 100 received and determined by the robot controller 108 may be combined with the model created in step 426 or 428 to obtain the fully posed geometry thereof corresponding to the state of the workspace 100 (step 430). In various embodiments, one or more pairs of discrete features in the depth image and on the robot 106 shown on the user interface are selected manually by the operator or automatically by the control system 112 (step 432). Based thereon, the registration module 239 may perform registration using, for example, refinement steps described above (step 434). Additionally, or alternatively, the registration module 239 may introduce one or more constraints by picking one or more pair of features on the image of the scene (step 436), and then performing automatic registration of the sensor system 101 to the machinery in the presence of the constraint(s) (step 438).

Referring to FIG. 4C, in various embodiments, automated registration of the sensors $\mathbf{102}_{1\text{-}3}$ to the machinery involves use of a registration library 255. In a step 442, a registration library 255 including one or more configuration parameters (such as a number of iterations for fine-tuning the registration, a number of 3D point cloud data per mesh, one or more convergence criteria, etc.) is created. In a second step 444, the registration module 239 automatically compares the state of the robot(s) and/or machinery in the image of the scene against that of the robot(s) and/or machinery in the stored images of the scene in the registration library 255 and then identifies a stored image that provides the best matching state. The registration module 239 may then retrieve the configuration parameter(s) associated with the best-matched state in the image of the scene (step 446), and based thereon, perform automated registration of the sensors $\mathbf{102}_{1\text{-}3}$ to the machinery (step 448). Optionally, the control system 112 and the robot controller 108 may re-pose the robot 106 and/or other machinery to one or more additional known states (e.g., states that have been successfully employed previously for registration) (step 450). Data related to the state(s) of the robot 106 and/or other machinery and the data acquired by the sensors $\mathbf{102}_{1\text{-}3}$ during this procedure can be combined to provide a larger registration data set (step 452). In one embodiment, the combined data can then be compared against the data stored in the registration library 255 to identify the image having the best matching state as described in step 446 (step 454). Subsequently, the registration module 239 can retrieve the configuration parameter(s) associated with the best-matched state in the image of the scene (step 446), and based thereon, perform automated registration of the sensors $\mathbf{102}_{1\text{-}3}$ to the machinery (step 448). In some embodiments, the data acquired during re-posing of the robot 106 and/or other machinery to the additional known state(s) is stored in the registration library 255 (step 456).

3) Configuration of Sensors to Appropriately Cover a Scene

To determine an appropriate setup of the 3D sensors $\mathbf{102}_{1\text{-}3}$ for best providing coverage of an area in the workspace 100, various considerations, such as occlusions caused by objects relative to the sensors $\mathbf{102}_{1\text{-}3}$, must be considered. In various embodiments, the user interface shown on the display 220 provides an interactive 3D display that shows the coverage of all sensors $\mathbf{102}_{1\text{-}3}$ to aid in configuration. If the system is configured with sufficient high-level information about the machinery being controlled, such as the location(s) of a dangerous part or parts of the machinery and the stopping time and/or distance, the control system 112 (e.g., the analysis module 237) may be configured to provide intelligent feedback as to whether the configuration of the sensors $\mathbf{102}_{1\text{-}3}$ provides sufficient coverage, and/or suggest placement for additional sensors.

In some embodiments, the feedback further includes, for example, a simple enumeration of the areas that are not covered by the fields of the view of the sensors $\mathbf{102}_{1\text{-}3}$ and/or proposed sensor locations for achieving the optimal scene coverage. In order to achieve optimal placement of the sensors $\mathbf{102}_{1\text{-}3}$, in various embodiments, the analysis module 237 may, based on the feedback, cause a light source (not shown) to project onto the workspace 100 a signal or one or more light beams that outline the monitored coverage of the sensors $102_{1-3}$ and/or the proposed location for each sensor. The human operator H may then place or adjust the sensors $102_{1-3}$ based on the proposed sensor locations and/or the outlined coverage. In addition, the control system 112 (e.g., the analysis module 237) may aid the operator H in sensor placement through an augmented reality or virtual reality device that projects an image of the workspace 100 and the sensor coverage onto the display 220 (or a headset). The operator H may place/adjust the sensors based on their locations shown on the image on the display 220. The placement/adjustment of the sensors $102_{1-3}$ may be automated. For example, as described above, the sensors $102_{1-3}$ may be supported by software/hardware components $114_{1-3}$ that are configured to change the poses and positions of the sensors $102_{1-3}$. In various embodiments, based on the feedback provided by the analysis module 237, the control system 112 may be configured to adjust the software/hardware components $114_{1-3}$ so as to achieve the optimal scene coverage of the sensors $102_{1-3}$. In one implementation, the control system 112 further operates the machinery (e.g., move the robot via the controller 108) to a location that can be observed by all (or at least most) sensors $102_{1-3}$, thereby improving the accuracy of the registration, as well as dynamically determining occlusions or unsafe spaces that cannot be observed by the sensors $102_{1-3}$; these are marked as unsafe areas in the workspace 100.

In various embodiments, the control system 112 can be programmed to determine the minimum distance from the machinery at which it must detect a person in order to stop the machinery by the time the person reaches it (or a safety zone around it), given protective separation distances determined by the industrial standards, the robot or machine manufacturer, or through a dynamic model of the machinery (which includes conservative estimates of walking speed and other factors). Alternatively, the required detection distance can be input directly into the control system 112 via the display 220. The control system 112 can then analyze the fields of view of all sensors $102_{1-3}$ to determine whether the workspace 100 is sufficiently covered to detect all approaches. If the sensor coverage is insufficient, the control system 112 may propose new locations for existing sensors $102_{1-3}$, and/or locations for additional sensors, that may remedy the coverage deficiency. Otherwise, the control system 112 may default to a safe state and not permit any machinery to operate unless the analysis module 237 verifies that all approaches can be monitored effectively by the sensors $102_{1-3}$.

In some instances, there are areas that the sensors $102_{1-3}$ cannot observe sufficiently to ensure safety, but that are guarded by other means such as cages, etc. In this case, the user interface can be configured to allow the human operator H to indicate to the control system 112 that these areas may be considered safe, overriding the sensor-based safety analysis and/or any built-in inherent safety analysis.

Figure 5A:
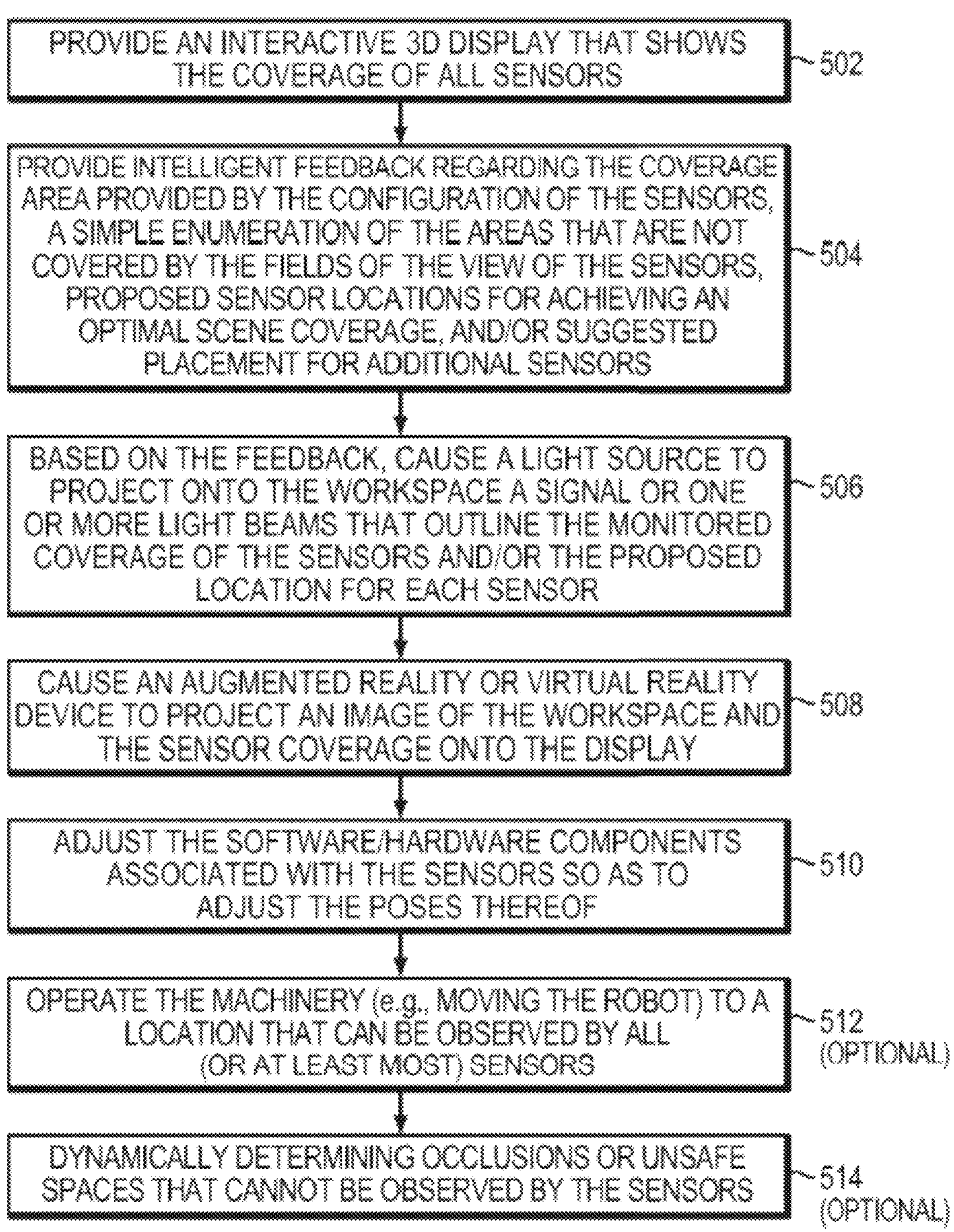
FIGS. 5A and 5B are flow charts illustrating exemplary approaches for configuring sensors to appropriately cover a scene in a workspace, in accordance with various embodiments of the present teaching.
Figure 5B:
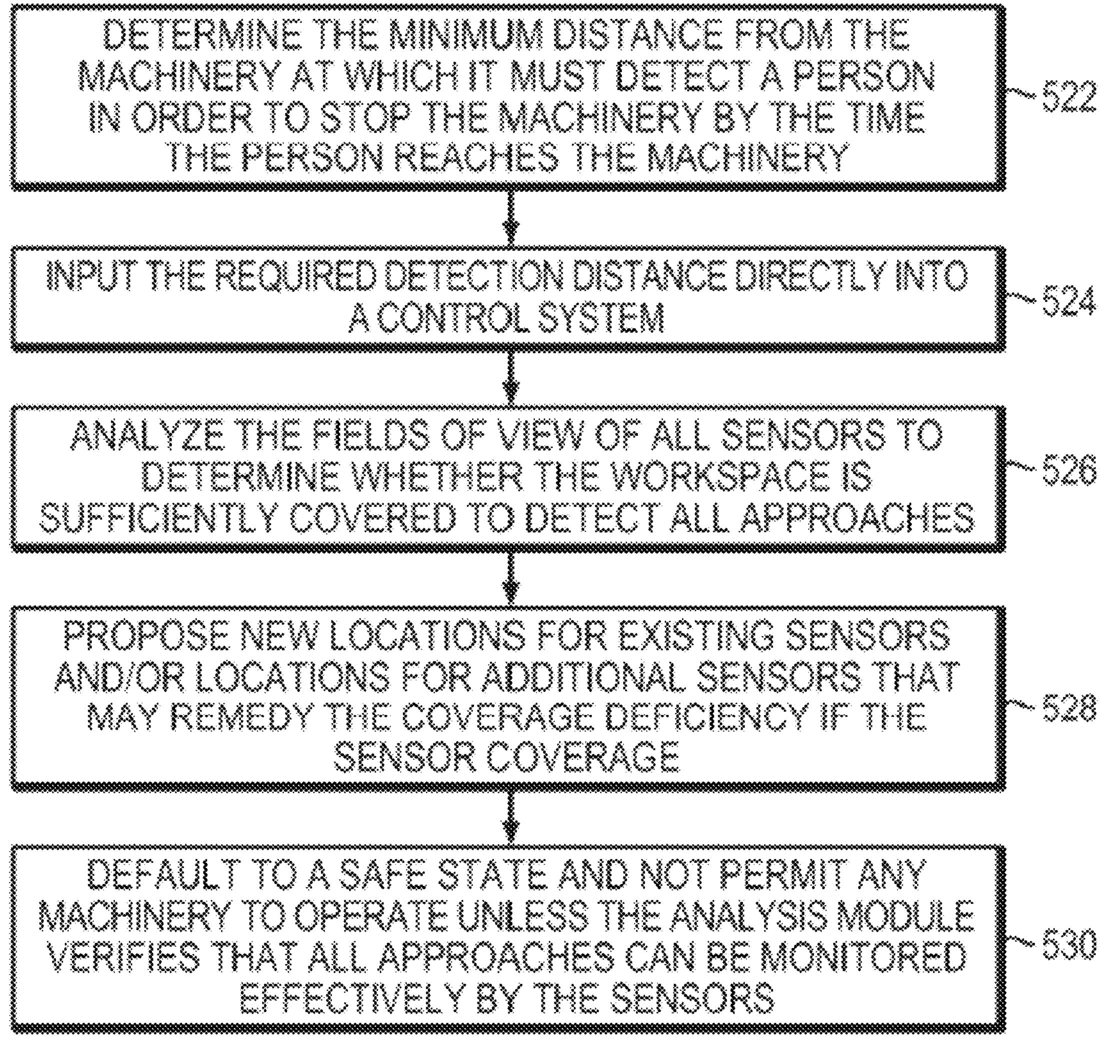

FIGS. 5A and 5B are flow charts illustrating exemplary approaches for configuring sensors to appropriately cover a scene in a workspace. Referring first to FIG. 5A, in a first step 502, the user interface shown on the display 220 may provide an interactive 3D display that shows the coverage of all sensors $102_{1-3}$. If the system is configured with sufficient high-level information about the machinery being controlled, the control system 112 will provide intelligent feedback regarding the coverage area provided by the configuration of the sensors $102_{1-3}$, e.g., as a simple enumeration of the areas that are not covered by the fields of the view of the sensors $102_{1-3}$, proposed sensor locations for achieving an optimal scene coverage, and/or suggested placement for additional sensors (step 504). In one embodiment, the analysis module 237 may, based on the feedback, cause a light source to project onto the workspace 100 a signal or one or more light beams that outline the monitored coverage of the sensors $102_{1-3}$ and/or the proposed location for each sensor (step 506). Additionally, or alternatively, the analysis module 237 may cause an augmented reality or virtual reality device to project an image of the workspace 100 and the sensor coverage onto the display 220 (step 508). Based on the feedback provided by the analysis module 237 and/or the projected sensor coverage and/or the proposed locations of the sensors, the control system 112 may be configured to adjust the software/hardware components $114_{1-3}$ associated with the sensors so as to adjust the poses thereof, thereby achieving the optimal scene coverage (step 510). Optionally, the control system 112 further operates the machinery (e.g., moving the robot) to a location that can be observed by all (or at least most) sensors $102_{1-3}$ (step 512), thereby improving the accuracy of the registration, as well as dynamically determining occlusions or unsafe spaces that cannot be observed by the sensors $102_{1-3}$ (step 514).

Alternatively, referring to FIG. 5B, the control system 112 can be programmed to determine the minimum distance from the machinery at which it must detect a person in order to stop the machinery by the time the person reaches it (step 522). In some embodiments, the required detection distance can be input directly into the control system 112 (step 524). The control system 112 can then analyze the fields of view of all sensors $102_{1-3}$ to determine whether the workspace 100 is sufficiently covered to detect all approaches (step 526). If the sensor coverage is insufficient, the control system 112 may propose new locations for existing sensors $102_{1-3}$, and/or locations for additional sensors that may remedy the coverage deficiency (step 528). Otherwise, the control system 112 may default to a safe state and not permit any machinery to operate unless the analysis module 237 verifies that all approaches can be monitored effectively by the sensors $102_{1-3}$ (step 530).

4) Registration Validation During System Operation

Once the registrations among the sensors $102_{1-3}$ and between the sensors $102_{1-3}$ and the machinery have been achieved, it is critical that the sensors $102_{1-3}$ remain in the same locations and orientations during operations of the machinery in the workspace 100. In one embodiment, the initial registered state of the sensors can be stored in memory 210 so that it can be retrieved later in case the system is not registered during operation and/or the workcell is moved to a new physical location. When one or more sensors $102_{1-3}$ are accidentally moved or drift out of their registered positions, the sensors may be misaligned relative to each other and/or the machinery; as a result, the coverage area of the sensors $102_{1-3}$ may vary outside a predefined area and the control outputs will be invalid and result in a safety hazard. In various embodiments, the same approaches used for initial registration among the sensors $102_{1-3}$ and between the sensors $102_{1-3}$ and the machinery described above can be extended to monitor (i) continued accuracy of registration among the sensors $102_{1-3}$ and between the sensors $102_{1-3}$ and the machinery during operation and (ii) the coverage areas of the sensors $102_{1-3}$. For example, during initial registration described above, the control system 112 (e.g., the registration module 239) may compute a set of metrics capturing the fit accuracy of the observed data to a model of static elements in the workspace that is created during the registration process. These metrics may include, for example, registration validation, real-time robot tracking, etc. As the system operates, the same metrics are recalculated in real time. If the metrics or deviations of the metrics from initial metric values (i.e., obtained during initial registration) exceed a specified threshold, and/or if the coverage area is outside the bounds of what is expected is observed, the registration during the system operation may be considered to be invalid and an error condition may be triggered. Subsequently, the robot 106 and/or machinery may be transitioned to a safe state where the robot/machinery is operated with a reduced speed or deactivated. Additionally, if during operation of the machinery, the sensors $\mathbf{102}_{1-3}$ remain in position but the fields of view are obscured or blocked, and/or the measured sensor signals are degraded (e.g., through some failure of the system or through human action), the control system 112 may determine that the outputs are invalid and then transition the machinery to the safe state.

Figure 6:
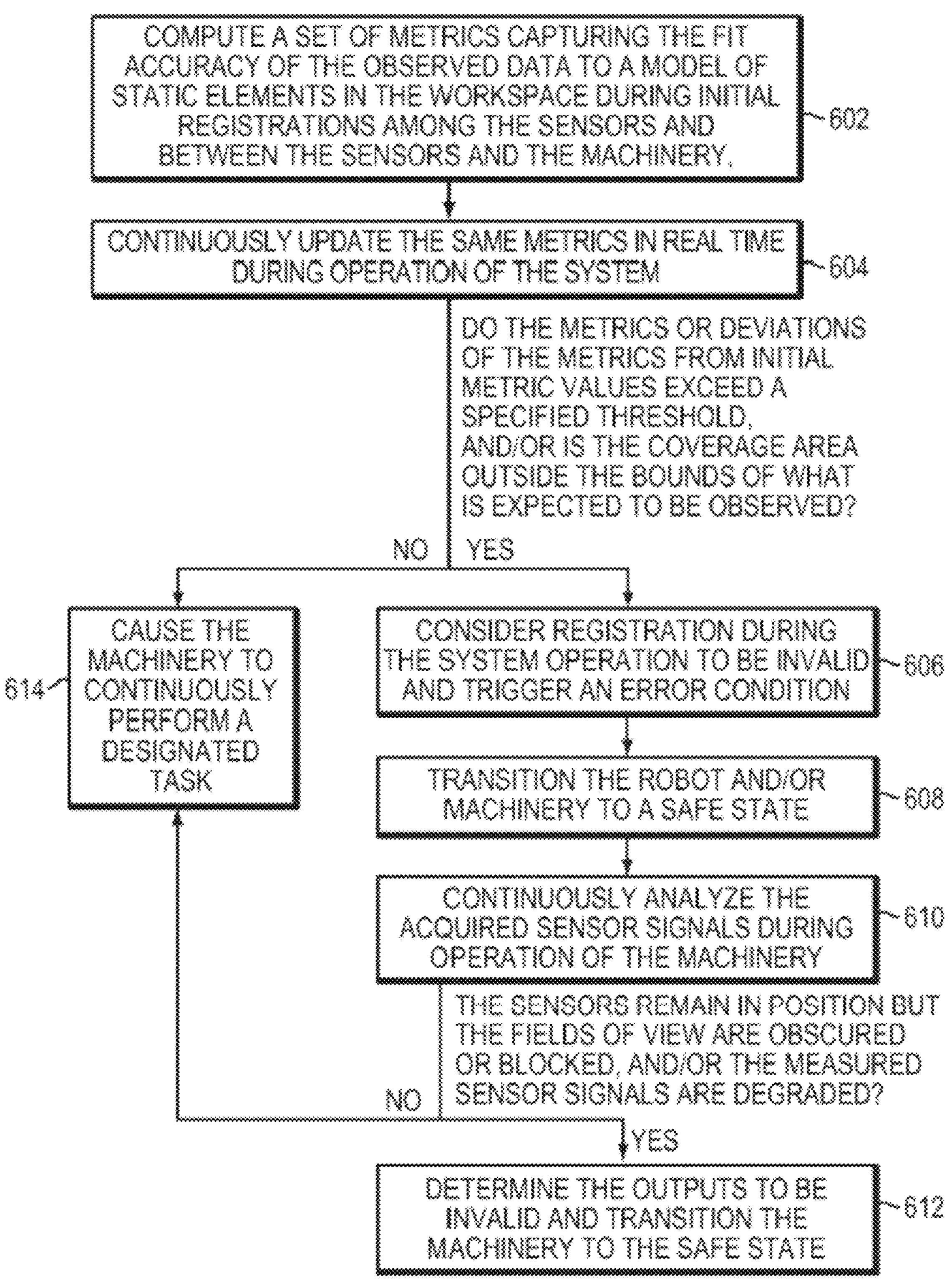
FIG. 6 is a flow chart illustrating an approach for validating registrations among sensors and between the sensors and machinery during operation of machinery, in accordance with various embodiments of the present teaching.

FIG. 6 is a flow chart illustrating an exemplary approach for validating registrations among sensors and between the sensors and machinery during operation of machinery. In a first step 602, during initial registrations among the sensors $\mathbf{102}_{1-3}$ and between the sensors $\mathbf{102}_{1-3}$ and the machinery, the registration module 239 may compute a set of metrics (e.g., registration validation, real-time robot tracking, etc.) capturing the fit accuracy of the observed data to a model of static elements in the workspace 100 that is created during the registration process. Upon completion of the registrations and as the system operates, the registration module 239 may continuously update the same metrics in real time (step 604). If the metrics or deviations of the metrics from initial metric values (i.e., obtained during initial registration) exceed a specified threshold, and/or if the coverage area is outside the bounds of what is expected to be observed, the registration during the system operation may be considered to be invalid and an error condition may be triggered (step 606). Subsequently, the robot 106 and/or machinery may be transitioned to a safe state where the robot/machinery is operated with a reduced speed or deactivated (step 608). Additionally, the analysis module 237 may continuously analyze the acquired sensor signals during operation of the machinery (step 610). If the sensors $\mathbf{102}_{1-3}$ remain in position but the fields of view are obscured or blocked, and/or the measured sensor signals are degraded (e.g., through some failure of the system or through human action), the control system 112 may determine that the outputs are invalid and then transition the machinery to the safe state (step 612). If the metrics or deviations of the metrics from initial metric values do not exceed the specified threshold, the coverage area is within the bounds of the expected observation area, the fields of view of the sensors are not obscured or blocked, and the measured sensor signals are not degraded, the control system 112 may cause the machinery to continuously perform a designated task (step 614).

According to some embodiments of the present teaching, a registration for a sensor may be a two-step process: the first step is to generate an initial estimate for sensor locations that is relatively close to the correct pose; and the second step is to refine this initial estimate to come up with an optimal pose for each sensor to minimize overall error. Most techniques for fine registration and optimization rely on moving towards local minimums or error functions, which requires an initial estimate that is close to correct.

The initial estimate may come from a variety of sources: a prior registration, import from CAD, and/or some manual or software-augmented processes. If registration is being repeated because a sensor was moved or replaced, or because a workcell is duplicated, or disassembled from one location and reassembled in another, a prior registration for the same workcell may be utilized for initial estimate. This often occurs when a workcell is developed at an integrator site and then relocated to its production location. When sensor locations are identified at design time in CAD, e.g. if the workcell is built relatively close to the CAD specification, the CAD-identified locations may serve as the initial estimates. In addition, the initial estimate may come from 3D manipulation of depth images, or a floor alignment feature. The present teaching discloses methods to generate initial estimates based on floor alignment.

In most factory settings, the floor is sufficiently close to an ideal plane to serve as an alignment marker, or a shape with known geometry, that sensors can be registered to. Using the floor as the alignment marker helps to eliminate three of the six degrees of freedom in the initial registration. Once the floor plane is identified in a sensor image, the floor plane can be used to uniquely determine how high off the floor the sensor is located, and two of the three rotation parameters. In some embodiments, for initial registration, subsequent manual manipulation can be constrained to only allow changing the remaining degrees of freedom (translation along the floor plane and rotation around the floor plane normal), which can significantly simplify the remaining initial alignment interaction. Similar constraining of the degrees of freedom may be used for subsequent refinement to recover globally optimal sensor poses. Presence of the plane can help to reduce relative pose error between sensors, including those with non-overlapping fields of view, because the plane of the floor can be considered a shared constraint for all the sensors that observe it. Other markers, or registration targets, tend to be smaller in size than the floor, and each is usually only observable by a pair or a few of the sensors. In contrast, the floor can be visible to all sensors in the workcell and approximates a geometric plane. After registration of each sensor to the workcell, the floor will be a common plane in images of all sensors, and the sensors are also registered to each other.

In general, the floor plane can be recovered from sensor images either automatically, or with manual guidance from a user. If the floor is the only or the dominant flat surface in the view of the sensor, then it can be recovered automatically using a robust estimation method. But sensors can also observe walls and fences, which can subtend a similarly significant portion of the field of view and are reasonably planar. Further, a significant portion of the floor can be obstructed by objects in the workcell, including fixtures and even the registration targets that are placed in the workcell to help registration. If all sensors in the workcell are known to be mounted within a range of distances above the floor and looking down at it to within a certain range of angles, the floor plane can be recovered that satisfies these limits. This can work for workcells where the only dominant flat surface within these limits is the floor. But it is possible that other large flat horizontal surfaces occur in the workcell that are sufficiently close to the floor to be falsely detected: e.g. ramps, pallets, conveyors, elevated platforms, etc. Therefore, it is less error prone to request the user to identify at least one location within the sensor image that corresponds to the floor. The user can be instructed to locate a region of the floor in the scanned image that is sufficiently clear and uncluttered and click on it in an interactive 3D interface. With this selection constraint, a robust plane estimation method can proceed in locating a plane that is consistent with the user's selection.

FIGS. 7A-7J are a series of exemplary graphical user interfaces for a user to perform sensor registration based on floor alignment, in accordance with various embodiments of the present teaching. In some embodiments, the sensors to be registered can be situated anywhere in a 3D space. For example, the sensors may be 3D image sensors disposed proximate to or in a workcell or workspace having a floor, e.g. the sensors $\mathbf{102}_{1\text{-}3}$ sensors monitoring the workspace 100 shown in FIG. 1. In some embodiments, the 3D image sensors are physically separated from each other, e.g. by at least one meter, and configured to acquire 3D images independently from each other. The 3D image sensors may acquire or capture a plurality of 3D images of the workcell. At least some of the plurality of 3D images include at least a portion of the floor.

Figure 7A:
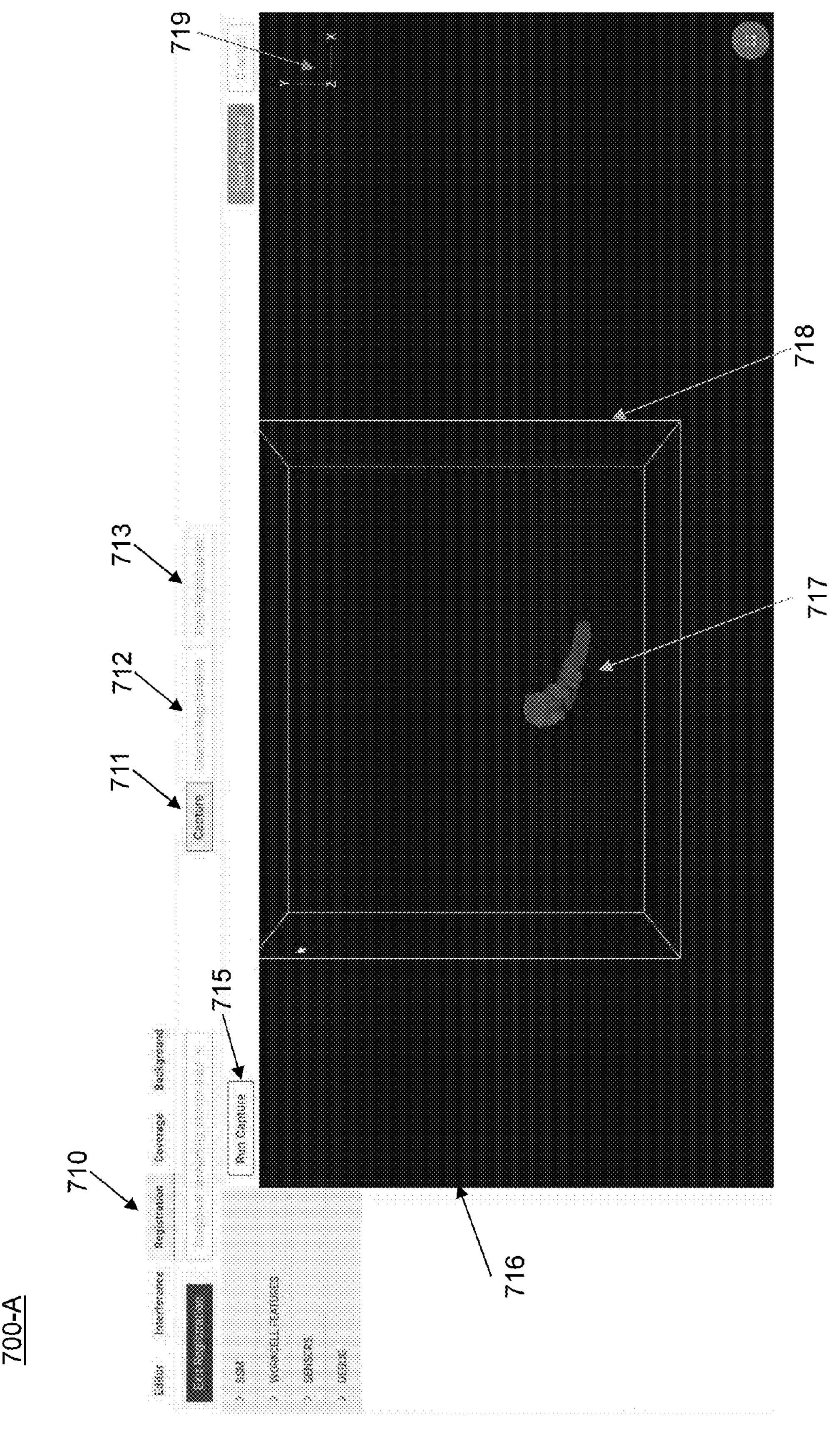
FIGS. 7A-7J are a series of exemplary graphical user interfaces for a user to perform sensor registration based on floor alignment, in accordance with various embodiments of the present teaching.

FIG. 7A shows a graphical user interface (GUI) 700-A, in accordance with various embodiments of the present teaching. In some embodiments, the GUI 700-A is shown to a user, after the user selects to perform sensor registration, e.g. by clicking on the "Registration" button 710. A full sensor registration process may include three stages: capture, coarse registration, and fine registration. In the GUI 700-A, the "Capture" button 711 is activated to indicate that the sensor registration is in a capture stage, where sensor data including depth images captured by each sensor are collected. Accordingly, the "Coarse Registration" button 712 and the "Fine Registration" button 713 are deactivated in GUI 700-A, because the coarse registration stage and the fine registration stage will not begin until the capture stage is complete.

As shown in FIG. 7A, the GUI 700-A includes a visual display window 716 showing a 3D image of robot 717 and a rectangular cuboid 718. In some embodiments, the 3D image of the robot 717 can be pre-generated by the system based on pose data and position data of the robot 717 obtained from a robot controller and/or the robot itself. The rectangular cuboid 718 represents the workcell to which the sensors will be registered. In some embodiments, the rectangular cuboid 718 may be pre-obtained by the system as a safeguarded space based on inputs from a user during system configuration. The user may rotate the images in the visual display window 716 all together with the rectangular cuboid 718 to generate views from different perspectives. Based on the 3D axis reference 719, the visual display window 716 of the GUI 700-A shows a top view of the workcell along the −Z direction, which includes a top view of the 3D image of robot 717 and the rectangular cuboid 718.

Figure 7B:
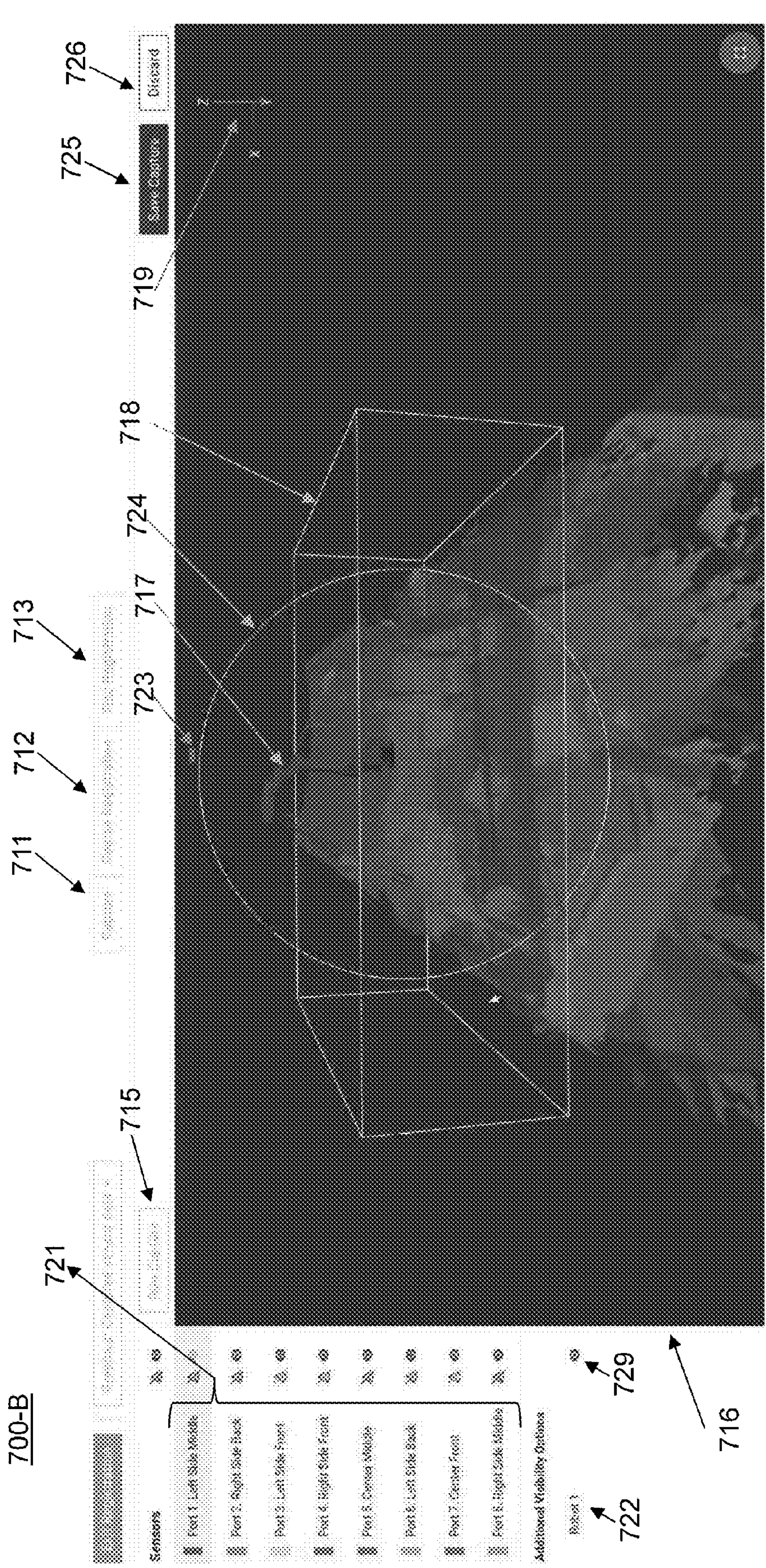

In some embodiments, the user may click the "Run Capture" button 715 in the GUI 700-A to trigger the sensors to capture 3D images of the workcell. FIG. 7B shows a GUI 700-B including the sensor data collected from all sensors after the sensors capture the 3D images of the workcell. In the example shown in FIG. 7B, there are eight sensors 721 in total. The visual display window 716 of the GUI 700-B shows all 3D images captured by all of the eight sensors 721 as a composite image, with each individual captured 3D image being shown in a unique color.

As shown in FIG. 7B, the 3D image of the robot 717 corresponds to Robot 1 722 listed in the GUI 700-B, where the user has an option to make the 3D image of the robot 717 (corresponding to Robot 1 722) visible or invisible in the visual display window 716, e.g. by selecting or deselecting the visibility icon 729 associated with the Robot 1 722, independently from the sensors. In addition, the user may also select or deselect a visibility icon associated with each of the eight sensors 721 to make the sensor's captured image visible or invisible in the visual display window 716, independently from other sensors.

The images in the visual display window 716 of the GUI 700-B are shown as a front view along the −Y direction, according to the 3D axis reference 719 in FIG. 7B. Before coarse and fine registrations, the position of each sensor is assumed to be located at the initial position 723, which is a predetermined position directly over the center of the workcell represented by the rectangular cuboid 718. In addition, before coarse and fine registrations, each sensor is assumed to face straight down to the floor of the workcell from the initial position 723. One goal of the coarse and fine registrations is to determine the position and orientation for each sensor with respect to the same workcell represented by the rectangular cuboid 718 in order to register each of the sensors relative to the workcell.

The visual display window 716 of the GUI 700-B includes a virtual trackball interface 724 that can be utilized by a user to move and/or rotate the images in the visual display window 716, without changing the relative positions of the images with respect to the rectangular cuboid 718. In some examples, a user may click the "Save Capture" button 725 to save the captured images of the sensors. In some examples, a user may click the "Discard" button 726 to discard the captured images of the sensors, and may perform another capture for the sensors.

Figure 7C:
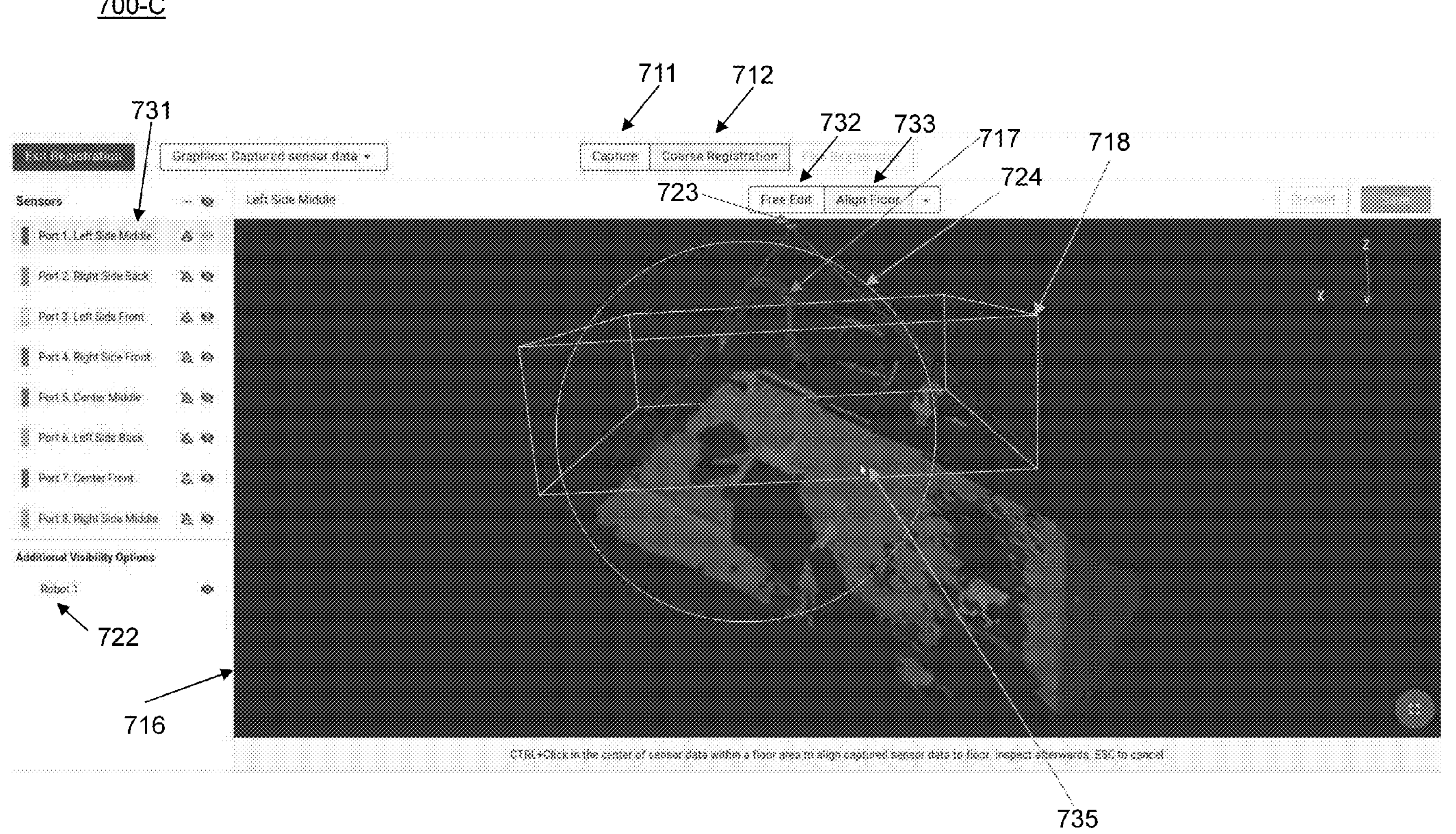

FIG. 7C shows a GUI 700-C, where the "Coarse Registration" button 712 is activated to indicate a coarse registration stage. After the capture stage of the eight sensors, a user may select each sensor from the eight sensors to perform a coarse registration. As shown in FIG. 7C, a user may select a first sensor 731 for coarse registration, e.g. by selecting the visibility icon associated with the first sensor 731 and/or deselecting the visibility icons associated with all other sensors. As such, the visual display window 716 of the GUI 700-C shows an image of the workcell captured by the first sensor 731.

Although the first sensor 731 is named as "Left Side Middle," e.g. based on installation information of the first sensor 731, the exact position and orientation of the first sensor 731 relative to the workcell are not known before registration. Accordingly, the exact position of a floor in a captured image of the first sensor 731 relative to the rectangular cuboid 718 is not known before registration.

During the coarse registration stage, the user may utilize the "Free Edit" function 732 to edit the image captured by the first sensor 731, e.g. by making notes or moving the image using the virtual trackball interface 724. In addition, during the coarse registration stage, the user may utilize the "Align Floor" function 733 to identify a floor in the image captured by the first sensor 731, and align the identified floor to a floor represented by the bottom surface of the rectangular cuboid 718. Before performing the "Align Floor" function 733, the position of the first sensor 731 is assumed to be located at the initial position 723, which is directly over the center of the workcell represented by the rectangular cuboid 718.

As shown in FIG. 7C, after the user selects the "Align Floor" function 733, the user is instructed to perform "CTRL+Click in the center of sensor data within a floor area to align captured sensor data to floor," where the instruction is displayed to the user under the visual display window 716. That is, the user may identify, in the captured image, a point indicating a portion of the workcell floor in the captured image; and can press CTRL on a keyboard while clicking the identified point to trigger the floor alignment of the first sensor 731. In some embodiments, a computer processor may identify a point in the captured image corresponding to a point on the floor. The computer processor may request the user to verify the point before proceeding to the next steps.

In some embodiments, after the user selects a section of floor in the captured image by clicking a point 735 in the visual display window 716, a computing device executing the "Align Floor" function 733 may then automatically compute a floor plane using an area of point cloud within a predefined radius around the selected point 735. The computing device may then perform a transformation of the selected floor plane to the workcell using a matrix rotation and translation operation. The transformation aligns the mean normal direction of a region-of-interest in the workcell to the floor normal direction in the selected floor plane, and aligns the floor plane to a user-specified height. The system may then apply the computed transformation to the point cloud of the entire captured image. Details of this process in at least one embodiment are described in more detail below.

In some embodiments, the user manipulates a view of the scene until the user can see a section of the floor that is clear and unobstructed over a circle. In some embodiments, the circle has a predetermined diameter, e.g. 30 cm. The user then clicks the center of this area. The system can automatically determine or define a ray line extending from the user's point of view through the scene to the clicked location. The system can search the sensor image and locate a point that lies nearest to the ray line. If the distance from the nearest point to the ray line is greater than a threshold, e.g. 10 cm, the system may determine that the click missed the scan, and the input is rejected, and the user may be requested to perform another selection. Otherwise, all points within a predetermined radius of a selected point, i.e. the point nearest to the ray line, are collected as candidate points for the plane fit. In some embodiments, the predetermined radius may be 30 cm, which also defines a region-of-interest with the predetermined radius around the selected point. In some embodiments, if there are fewer than a threshold number (e.g. 100) of candidate points as collected above, the system may determine that the selected region is too sparse, such that the input is rejected, and the user may be requested to perform another selection. Otherwise, the selected region may be suitable for further processing.

Then the system can compute an optimal plane fit to the candidate points, based on an optimal function. For example, the optimal plane fit can minimize the sum of square distances from the region-of-interest points to the fitted plane. In some embodiments, for the optimal plane fit, after the user picks a point in the point cloud, the system verifies that the points inside the spherical region-of-interest with a predefined radius around the selected point are as planar as possible. This may be accomplished by computing the mean and the variance of the point normal directions inside the region. For example, the system can compute a normal direction for each point, based on locations of the point's neighboring points. As such, capping the variance of point normal directions is equivalent to capping a variance of local curvature of the surface that is sampled by those points. If the variance is below a predefined threshold, the points in the region are deemed sufficiently planar and the mean becomes the representative orientation of the planar patch inside the region. Then, the system can compute a transformation aligning this mean to the floor normal direction, i.e. the upright direction. The system may apply the computed transformation to the sensor's point cloud to register the sensor. If the variance of candidate point distances to the plane exceeds the predefined threshold, the selected region is determined to be non-planar, and the input is rejected. The user may be requested to perform another selection.

Figure 7D:
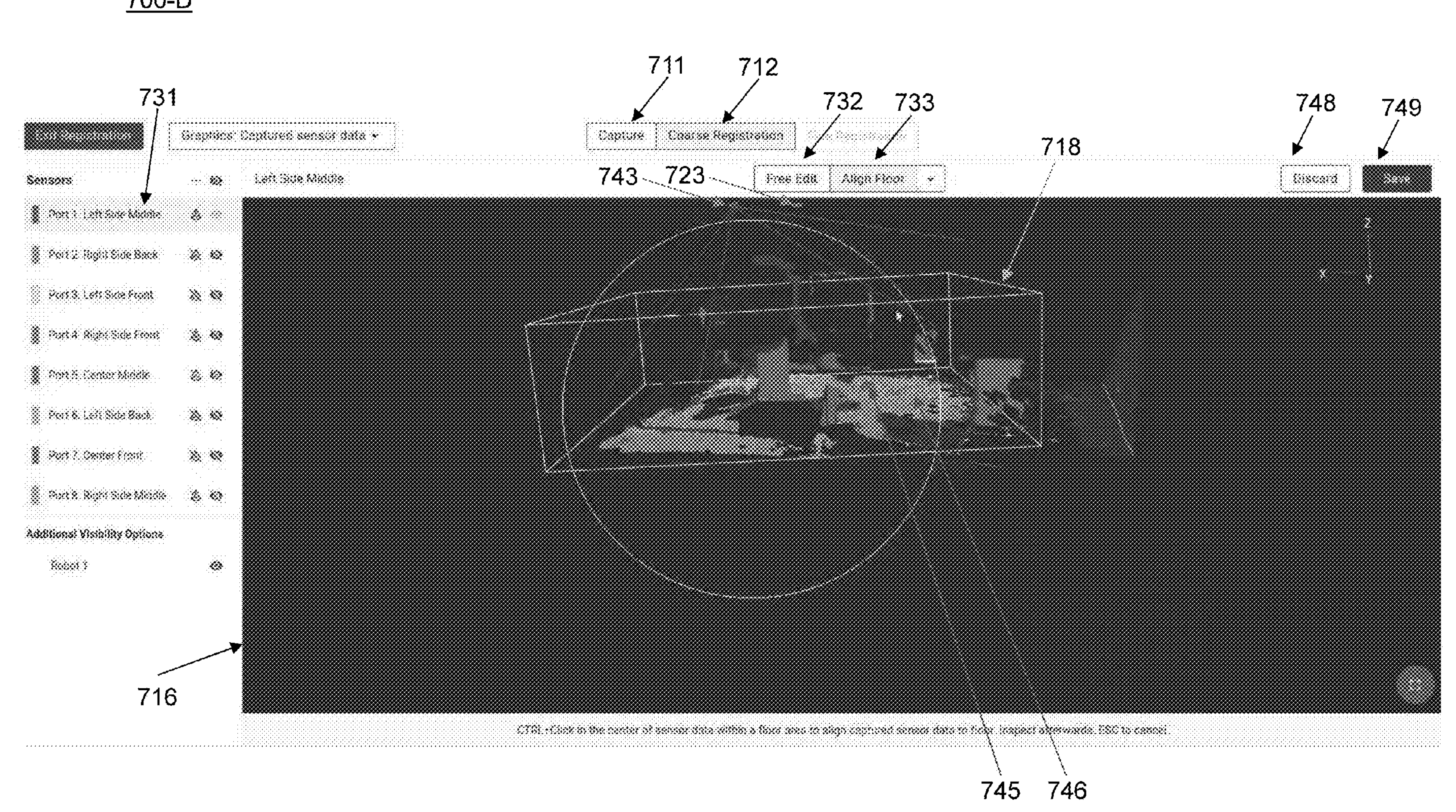

According to some embodiments, FIG. 7D shows a GUI 700-D, where the visual display window 716 of the GUI 700-D shows a result of the coarse registration for the first sensor 731, after the user clicks the point 735 in FIG. 7C. As shown in FIG. 7D, a sphere 745 represents a region-of-interest, where the user's selected point 735 is located in the center of the sphere 745. A plane portion 746 in FIG. 7D includes points in the 3D depth image which represent the recovered floor plane. While not explicitly shown, the entire recovered floor plane would go near all of the points in the plane portion 746. In some embodiments, the plane portion 746 includes at least one point in the region-of-interest 745. In some embodiments, the plane portion 746 is generated based on a plane that can pass near not only the region-of-interest but also the greatest number of points in the captured image, among all possible floor planes that can pass the region-of-interest. In some embodiments, the plane portion 746 is generated based on a plane that can not only pass near the region-of-interest but also satisfy a predetermined condition, e.g. a largest total surface area covered by points or a largest value making points near the user selection more important, among all possible floor planes that can pass the region-of-interest.

This visualization in the visual display window 716 of the GUI 700-D may be shown to a user after a selection is made by the user, the plane is located, and the transformation is applied. Different from the initial position 723 set for the first sensor 731, the visual display window 716 of the GUI 700-D shows an updated position 743 of the first sensor 731 relative to the workcell represented by the rectangular cuboid 718. While the transformation is applied to align the recovered floor plane represented by the plane portion 746 to the bottom surface of the rectangular cuboid 718, the same transformation is applied to change the position of the first sensor 731 from the initial position 723 to the updated position 743, without changing the position of the rectangular cuboid 718. That is, based on the "Align Floor" function 733 and the user selection of the point 735, the system determines that the first sensor 731 is not located at the initial position 723 as assumed before registration, but should be located at the updated position 743, relative to the workcell represented by the rectangular cuboid 718.

In some examples, a user may click the "Save" button 749 to save the coarse registration result in the visual display window 716 of the GUI 700-D for the first sensor 731, e.g. after the user inspects and is satisfied with the coarse registration result. In some examples, a user may click the "Discard" button 748 to discard the coarse registration result in the visual display window 716 of the GUI 700-D for the first sensor 731, e.g. after the user inspects and is not satisfied with the coarse registration result. The user's inspection may be based on whether every point in the captured image that is part of the floor has been covered by the plane portion 746, and/or whether each point in the plane portion 746 is part of the floor. The user may re-run the coarse registration or the "Align Floor" function 733 as many times as desired, e.g. by clicking another point in the captured image, until the user is satisfied with the coarse registration result.

Figure 7E:
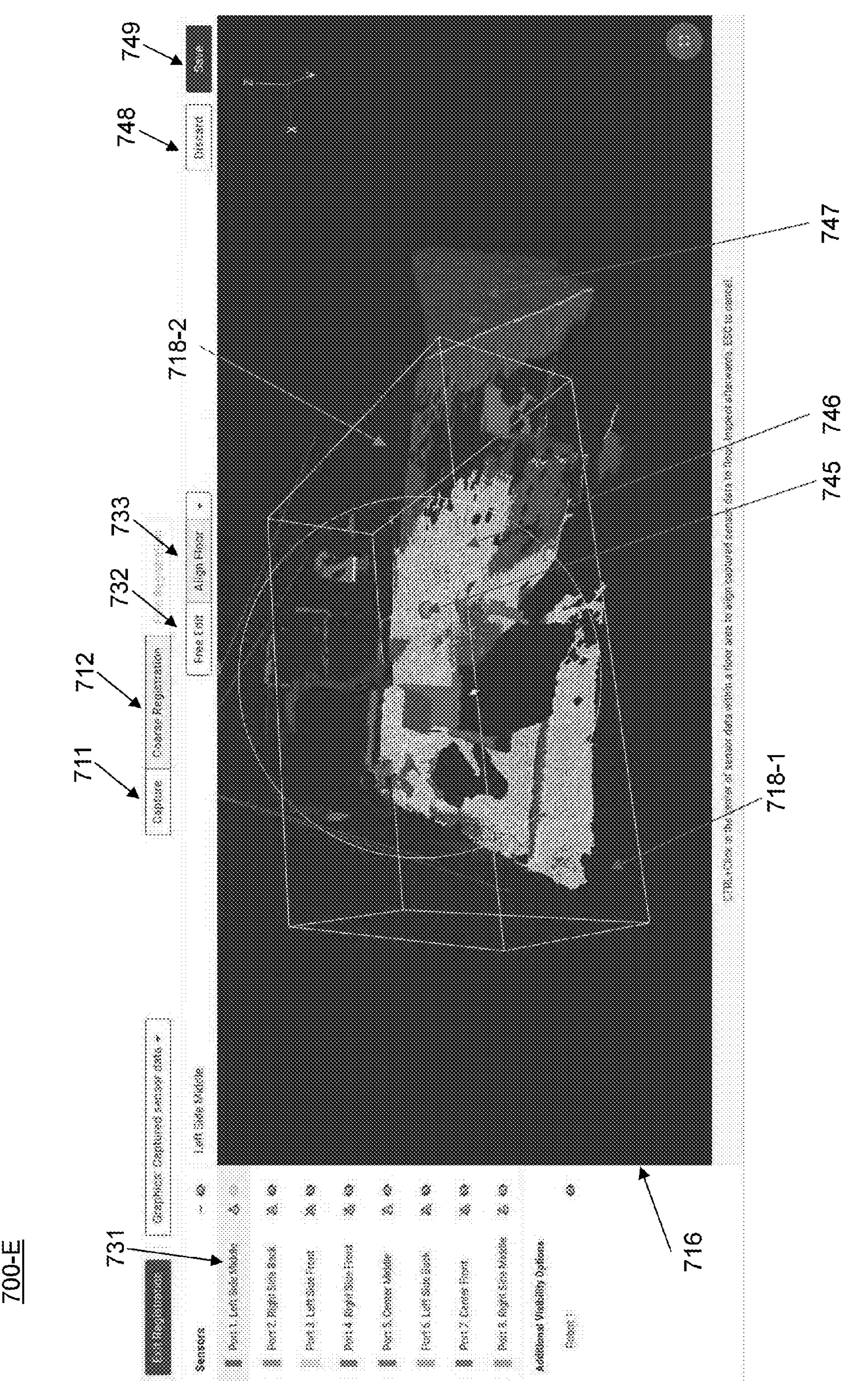

FIG. 7E shows a GUI 700-E, where the visual display window 716 of the GUI 700-E shows a detailed view of the coarse registration result for the first sensor 731. As shown in FIG. 7E, the "Align Floor" function 733 of the coarse registration aligns the recovered floor plane represented by the plane portion 746 to the bottom surface 718-1 of the rectangular cuboid 718, but does not automatically align a wall 747 of the workcell in the captured image to a corresponding side surface 718-2 of the rectangular cuboid 718. In some embodiments, the wall alignment may be performed during the fine registration stage for each sensor.

In some embodiments, it is assumed that all the candidate points in the region-of-interest need to be considered. The system may rely on the user to locate a suitable patch of the floor. As a result, the plane fit only considers the 30 cm area around the selected point. The plane fit is local in nature, and can be influenced by the local non-planarity of the floor, as well as local sensor measurement error. But this is acceptable for initial alignment and registration. On one hand, making the selection radius large (e.g. larger than 30 cm) can improve the plane fit but can make it difficult to locate a suitable region if the floor of the workcell is cluttered or significantly obscured. On the other hand, making the selection radius small (e.g. smaller than 30 cm) leads to a less stable plane fit with higher error and noise. In some embodiments, the system can determine a suitable radius for the region-of-interest, e.g. 30 cm, based on the unobstructed circle of visible floor in each depth image. For example, the system may determine the radius for the region-of-interest as 10%~30% (e.g. 20%) smaller than the largest unobstructed circle of visible floor in each depth image.

Considering all floor points, including those lying farther away from the picked location, would provide a more globally accurate plane fit. But it would require either a more sophisticated region selection user interface, or a robust fit algorithm that is able to locate the floor plane within the sensor data that is consistent with the simple point selection gesture, or even without any user input at all.

In some embodiments, for plane fit, the point initially selected by the user may be used to identify a smaller subset of all points. The smaller subset may include points lying within a smaller region-of-interest, e.g. 10 cm radius around the selected point. Then the system may locate a plane that contains at least one of the region-of-interest points and two other scan points from anywhere in the depth image, where the plane passes within a predetermined distance (e.g. 3 cm) of the largest number of other points from the sensor image, e.g. based on a constrained random sample consensus (RANSAC) algorithm. All points in the image within the predetermined distance (e.g. 3 cm) of a plane are considered inlier points of the plane. For example, after selecting one point in the region-of-interest, and two additional points anywhere in the image, the system can compute a candidate plane going through these points. The system may generate multiple candidate planes and select one of them to be a best plane based on a predetermined metric.

In some examples, the system can determine inlier points that are near each candidate plane. If there are more inliers associated with this candidate plane than a previous best plane, this candidate plane is used as a new best plane, and the inliers are stored accordingly. In some examples, the system can select the best plane based on the biggest surface area represented by all inlier points. In some examples, the system can select the best plane based on a combined intensity value of all inlier points. In some embodiments, the predetermined distance may be determined based on the noise of the sensors to be registered. Then, the system can compute an optimal plane fit to the inlier points associated with the best plane, to minimize the sum of square distances from the points to the fitted plane.

In some embodiments, all inlier points associated with the best plane form the plane portion 746 in FIG. 7D. The "Align Floor" function 733 aligns the optimal plane fit to the bottom surface 718-1 of the rectangular cuboid 718. In some embodiments, a candidate plane is computed based on merely points in the region-of-interest, and only inlier points in the region-of-interest are considered when computing the optimal plane fit.

In some embodiments, the user can select the points on the floor to be used as the region-of-interest manually, using painting gestures or a lasso-like selection gesture typically used by graphics programs. In some embodiments, the RANSAC algorithm can be used to detect all significant planar surfaces present in the sensor data, where the significant planar surfaces are all planar enough and sufficiently different from each other. The user can be requested to select among the significant planes, a plane that matches the floor based on their visualization. If only a single plane appears to satisfy the constraints typical for the workcell floor, then the plane can be selected automatically, without user input. For example, based on the constraints, the floor is expected to be 3-5 m away from the sensor, and tilted at no more than 30 degrees relative to the sensor's principal axis. In some embodiments, robust estimation algorithms other than RANSAC can also be used to locate the floor plane(s) within the scan data.

The floor plane recovered by this automatic process can be used for initial positioning of the sensors. In some embodiments, the recovered floor plane and/or the input provided by the user to select the plane can be preserved, and subsequently used during registration optimization to ensure that the final result is still consistent with the floor selection.

In some embodiments, the user may transition to another sensor to perform coarse registration, after the first sensor 731 is aligned and initially or coarsely registered. After a new sensor is selected, the system may repeat the above mentioned operations referring to FIGS. 7C-7E, to register the new sensor.

Figure 7F:
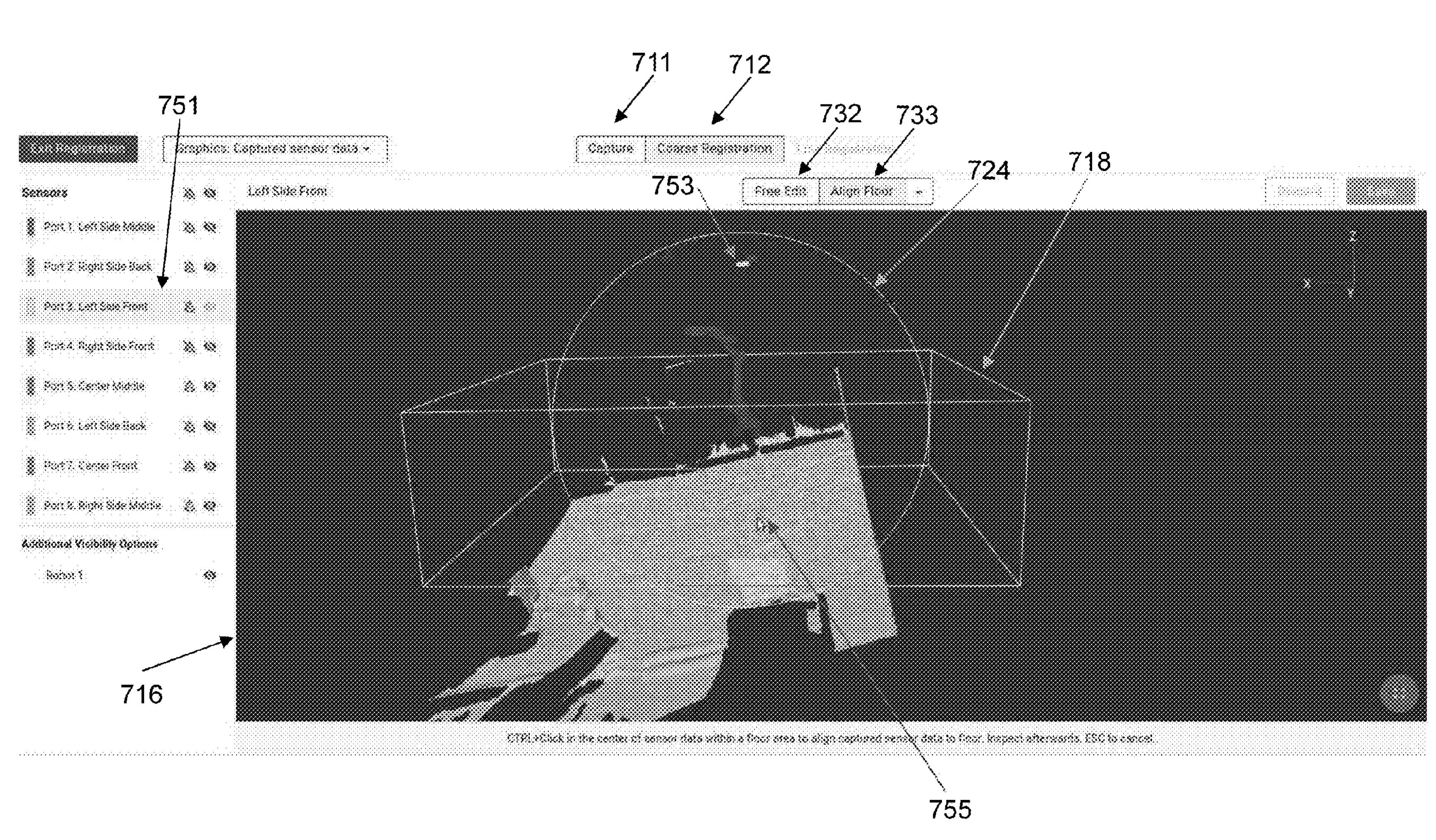

In some examples, FIG. 7F shows a GUI 700-F, where the user selects another sensor 751 for coarse registration. As shown in FIG. 7F, before performing the "Align Floor" function 733, the position of the sensor 751 is assumed to be located at the initial position 753, which is directly over the center of the workcell represented by the rectangular cuboid 718. In this example, the user clicks a point 755 in the visual display window 716 of the GUI 700-F to indicate a portion of the workcell floor in the captured image of the sensor 751.

Figure 7G:
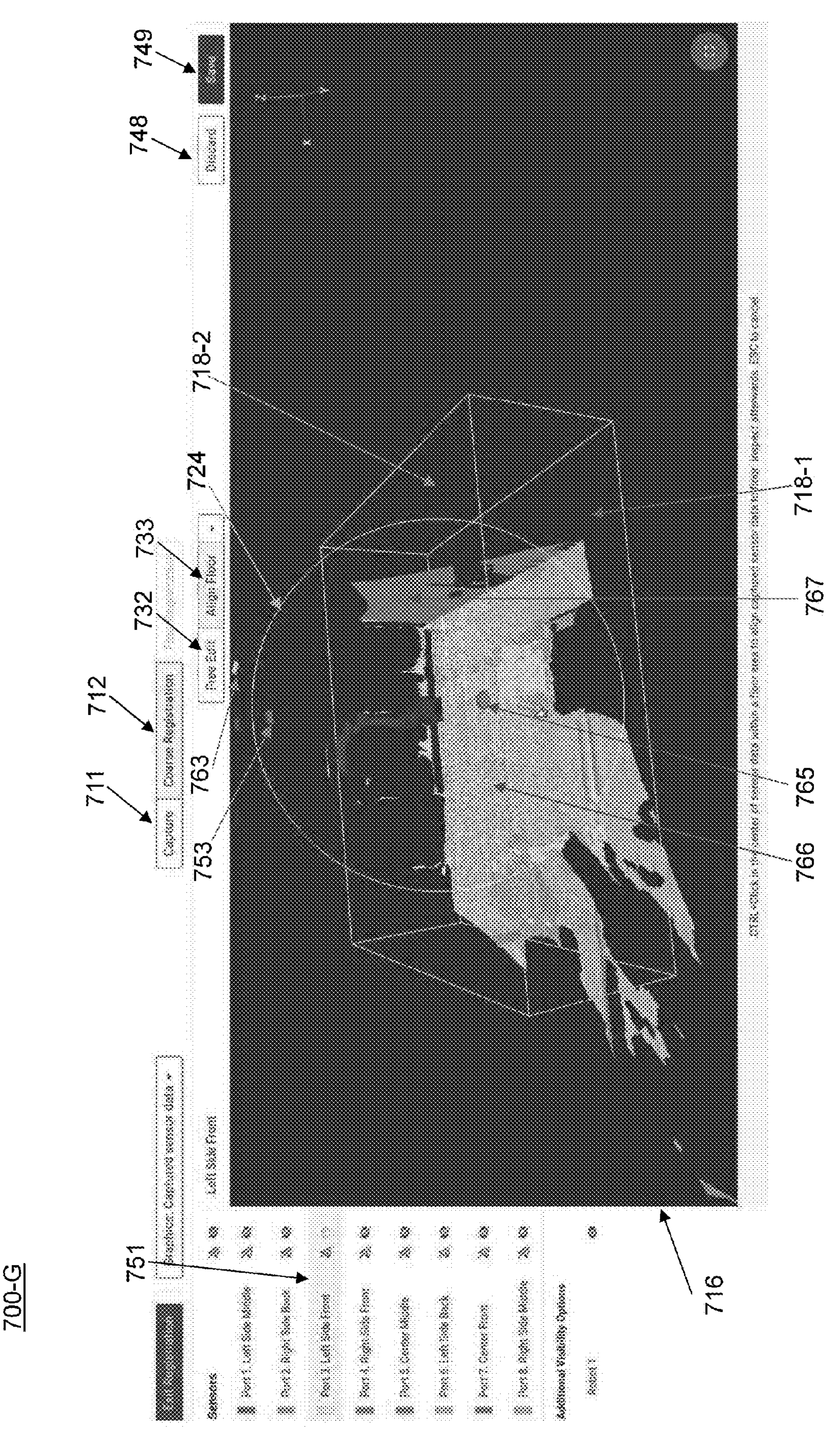

FIG. 7G shows a GUI 700-G, where the visual display window 716 of the GUI 700-G shows a result of the coarse registration for the sensor 751, after the user clicks the point 755 in FIG. 7F. As shown in FIG. 7G, a sphere 765 represents the region-of-interest, where the user's selected point 755 is located in the center of the sphere 765. A plane portion 766 in FIG. 7G includes points which represent the recovered floor plane in the captured image. While a transformation is automatically applied to align the recovered floor plane represented by the plane portion 766 to the bottom surface 718-1 of the rectangular cuboid 718, the same transformation is automatically applied to change the position of the sensor 751 from the initial position 753 to an updated position 763, without changing the position of the rectangular cuboid 718. As shown in FIG. 7G, the "Align Floor" function 733 of the coarse registration aligns the recovered floor plane represented by the plane portion 766 to the bottom surface 718-1 of the rectangular cuboid 718, but does not automatically align a wall 767 of the workcell in the captured image to a corresponding side surface 718-2 of the rectangular cuboid 718.

In some embodiments, the position of the rectangular cuboid 718 is fixed during the registration process for all sensors. That is, all sensors are registered based on the same frame reference corresponding to the workcell. As such, after each sensor is registered to the workcell represented by the rectangular cuboid 718, all sensors are also registered to each other. In addition, after each sensor is registered to the workcell represented by the rectangular cuboid 718, all sensors are also registered to the robot 717 that has been pre-registered to the workcell. The user may click the "Save" button 749 to save the coarse registration result in the visual display window 716 of the GUI 700-G for the sensor 751, or click the "Discard" button 748 to discard the coarse registration result in the visual display window 716 of the GUI 700-G for the sensor 751.

In some embodiments, the user can evaluate the floor alignment of all sensors' captured images together. If the floor of a sensor is not well aligned with the others, the user may adjust it with the "Align Floor" function 733 or manually. As such, the sensors are aligned and registered to each other, and to the floor of the workcell as well.

In some embodiments, the user can inspect the result output by the "Align Floor" function 733. If a correct floor plane is not highlighted or the translated depth image does not align with the bottom of the safeguarded space or the rectangular cuboid 718, the user may select another section of floor with the "Align Floor" function 733 or moves the captured image manually.

Figure 7H:
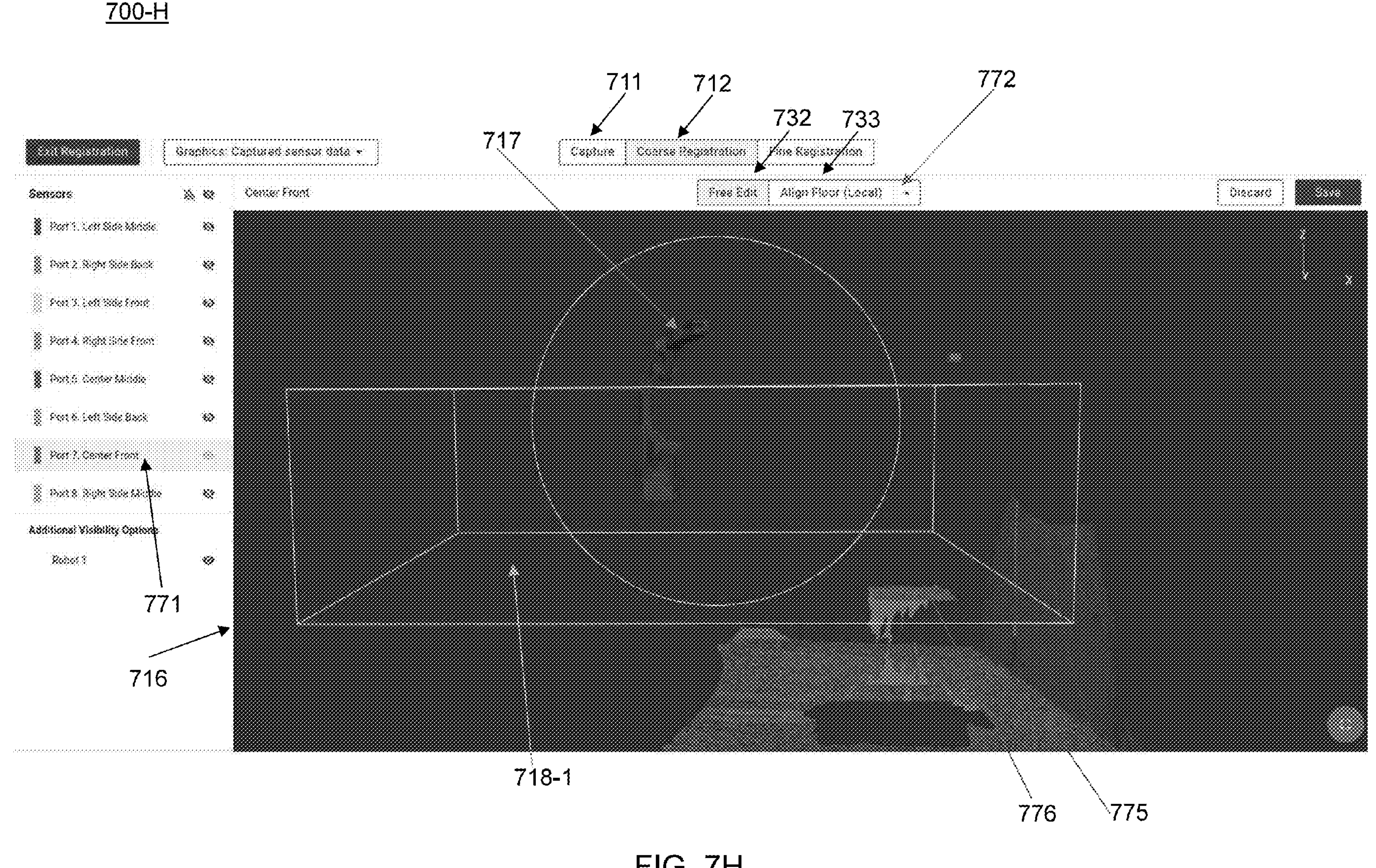
Figure 7I:
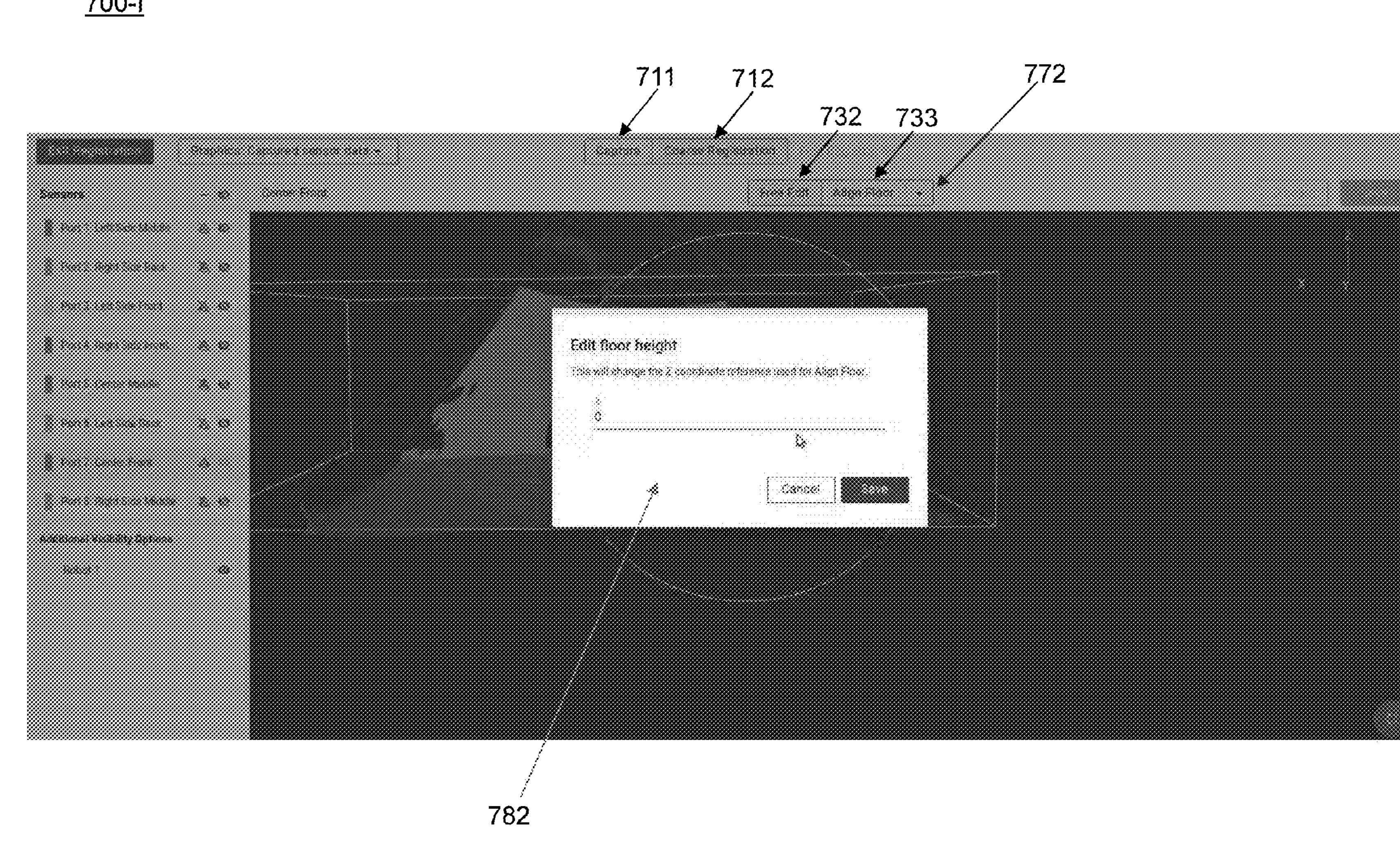

FIG. 7H shows a GUI 700-H, where the floor plane is not aligned with a bottom of the rectangular cuboid 718. This may be due to a user mis-clicking on a table-top 776 under the robot 717. As the table-top 776 might be a large or even the largest plane in the captured image, the "Align Floor" function 733 may proceed to generate a region of interest by treating the table-top 776 as a recovered floor plane in the visual display window 716 of the GUI 700-H. As shown in FIG. 7H, after coarse registration for a sensor 771, the table-top 776, rather than the floor plane 775, is aligned to the bottom surface 718-1 of the rectangular cuboid 718. In some examples, the user may discard this coarse registration result, if the user believes the recovered floor plane 776 is not actually the workcell floor. In some examples, the user may adjust this coarse registration result by a Z offset, if the user believes the recovered floor plane 776 is actually the workcell floor.

In some embodiments, the bottom surface 718-1 of the rectangular cuboid 718 is set to be the floor of the workcell at Z=0 position in the visual display window 716. Optionally, as shown in GUI 700-I in FIG. 7I, the user can adjust Z offset or coordinate reference of the floor in a captured image of a sensor, if the floor in the captured image is not at Z=0 position. For example, the user may set up a floor height by clicking a drop-down list 772, and entering a value for the Z offset in a pop-up window 782 to pre-configure a floor height for the subsequent "Align Floor" function 733. In some embodiments, the sensors' positions are constrained, with the Z position and some rotations pre-configured by the user. The user may complete registration with a combination of manual and automatic adjustments to set the remaining dimensions.

Figure 7J:
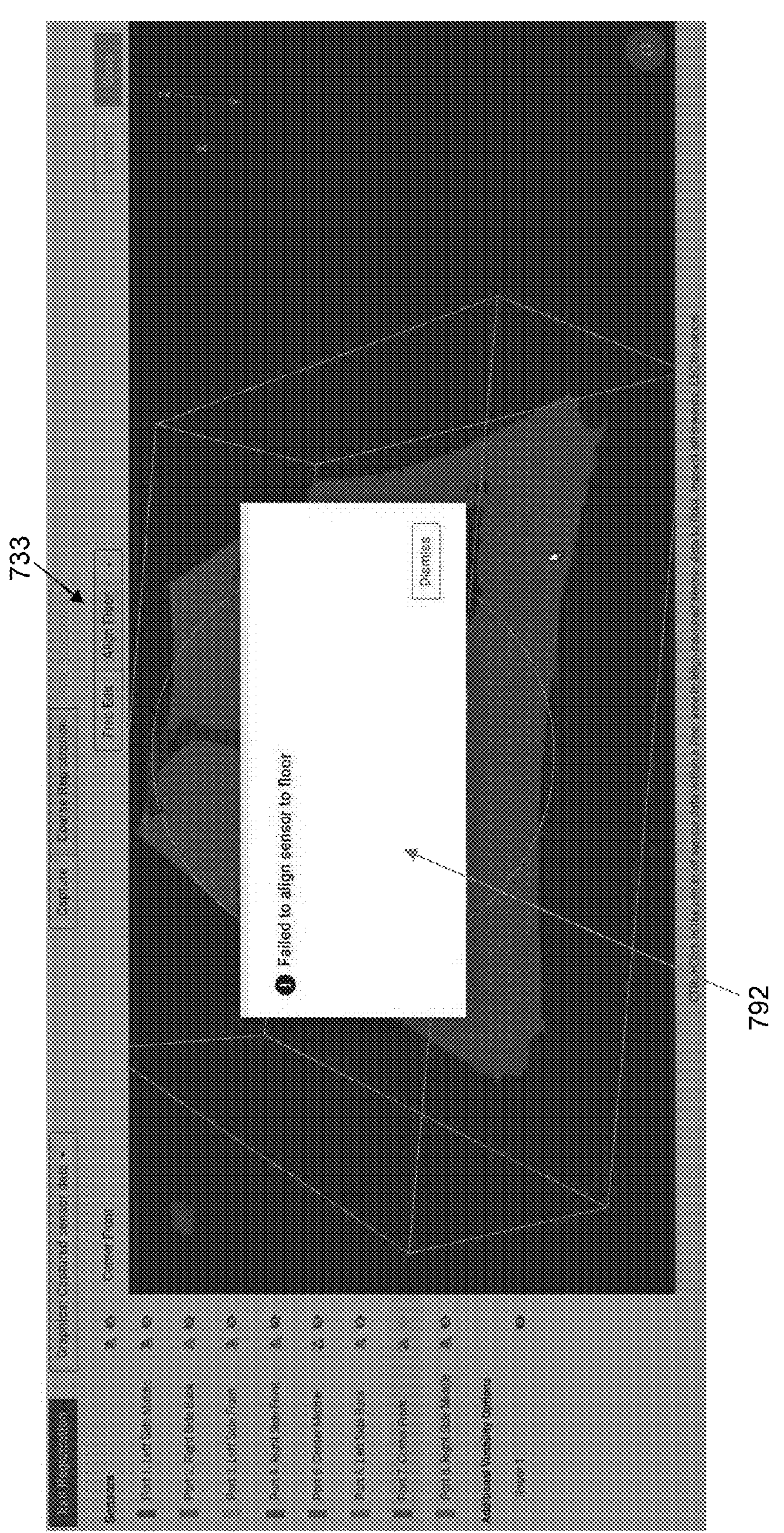

FIG. 7J shows a GUI 700-J, where an error message is displayed. As shown in FIG. 7J, a pop-up window 792 is automatically displayed to indicate "Failed to align sensor to floor," when the "Align Floor" function 733 fails for a sensor. The failure may happen, e.g. when a user selects a point outside the captured image to represent a floor, when a region of interest cannot be generated based on the user-selected point, when a floor plane cannot be recovered based on the user-selected point or a region of interest, or when the "Align Floor" function 733 cannot be completed for any other reason.

Figure 8:
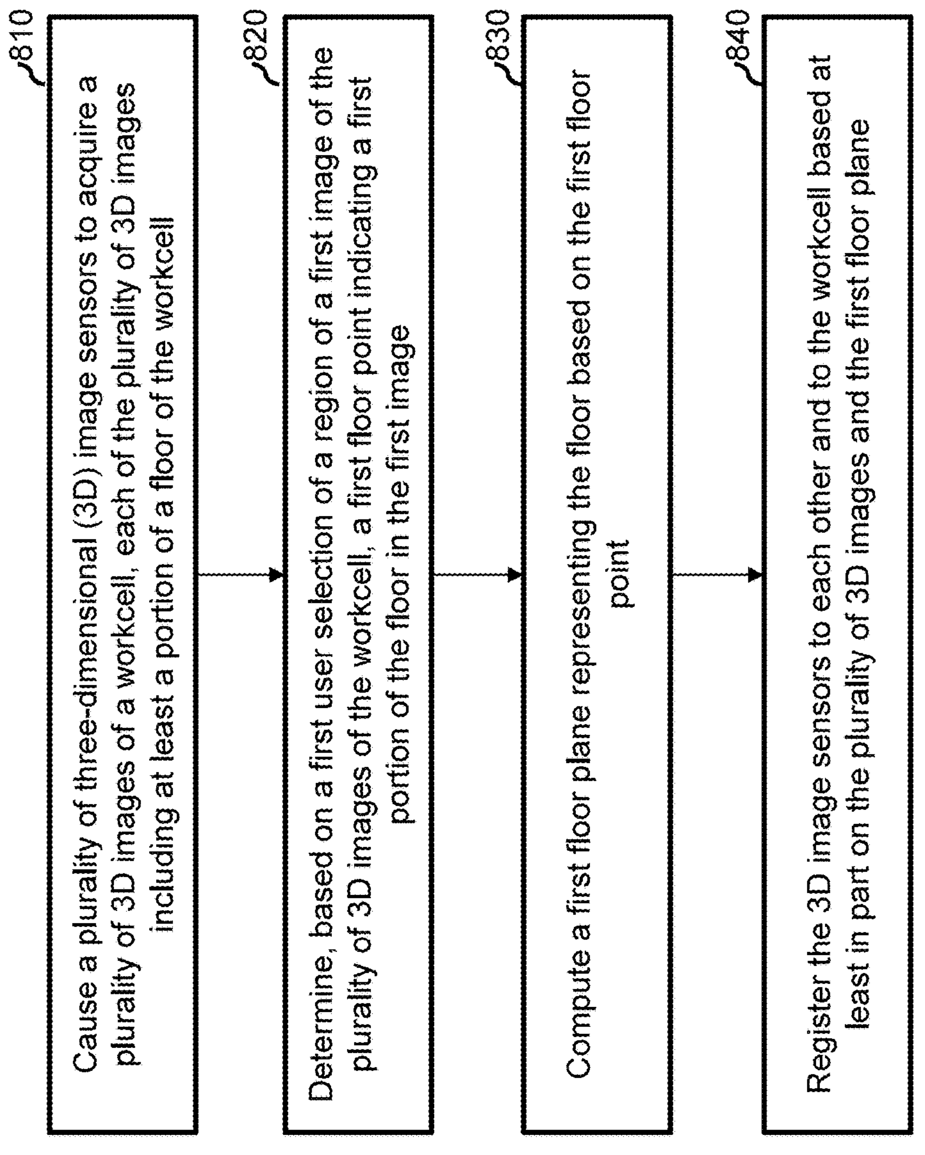
FIG. 8 is a flow chart illustrating a method for sensor registration based on floor alignment, in accordance with various embodiments of the present teaching.

FIG. 8 is a flowchart illustrating a method 800 for sensor registration based on floor alignment, in accordance with various embodiments of the present teaching. In some embodiments, the method 800 can be carried out by one or more systems as described in FIGS. 1-7. Beginning at operation 810, a plurality of three-dimensional (3D) image sensors is caused to acquire a plurality of 3D images of a workcell. At least one of the plurality of 3D images includes at least a portion of a floor of the workcell. At operation 820, based on a first user selection of a region of a first image of the plurality of 3D images of the workcell, a first floor point is determined to indicate a first portion of the floor in the first image. At operation 830, a first floor plane representing the floor is computed based on the first floor point. At operation 840, the 3D image sensors are registered to each other and to the workcell based at least in part on the plurality of 3D images and the first floor plane.

Although the methods described above are with reference to the illustrated flowcharts, it will be appreciated that many other ways of performing the acts associated with the methods can be used. For example, the order of some operations may be changed, and some of the operations described may be optional.

The term "controller" or "control system" used herein broadly includes all necessary hardware components and/or software modules utilized to perform any functionality as described above; the controller may include multiple hardware components and/or software modules and the functionality can be spread among different components and/or modules. For embodiments in which the functions are provided as one or more software programs, the programs may be coded in a suitable language as set forth above. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the present teaching, it will be apparent to those of ordinary skill in the art that other embodiments incorporating the concepts disclosed herein may be used without departing from the spirit and scope of the present teaching. Accordingly, the described embodiments are to be considered in all respects as only illustrative and not restrictive.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto.

Rather, the appended claims should be construed broadly, to include other variants and embodiments, which can be made by those skilled in the art.

What is claimed is:

1. A method of sensor registration for a workcell including a floor, the method comprising:

disposing a plurality of three dimensional (3D) image sensors proximate to the workcell;

acquiring, with the plurality of 3D image sensors, a plurality of 3D images of the workcell, wherein at least one of the plurality of 3D images includes at least a portion of the floor;

determining, based on a first user selection of a region of a first image of the plurality of 3D images of the workcell, a first floor point indicating a first portion of the floor in the first image;

computing a first floor plane representing the floor based on the first floor point; and registering the 3D image sensors to each other and to the workcell based at least in part on the plurality of 3D images and the first floor plane.

2. The method of claim 1, wherein computing the first floor plane comprises:

determining, within the first image, a region-of-interest around the first floor point, wherein the region-of-interest includes a plurality of candidate points within the region of interest in the first image;

computing a fitted plane based on at least one of the plurality of candidate points of the region-of-interest; and determining whether the fitted plane is suitable to be adopted as the first floor plane to register a first 3D image sensor acquiring the first image.

3. The method of claim 2, wherein the fitted plane minimizes a sum of square distances from the plurality of candidate points to the fitted plane.

4. The method of claim 2, wherein determining whether the fitted plane is suitable to be adopted as the first floor plane to register the first 3D image sensor comprises:

computing a mean normal direction of the fitted plane based on a mean of normal directions of the plurality of candidate points;

computing a variance of the normal directions of the plurality of candidate points; and comparing the variance to a predetermined threshold to determine whether the fitted plane is suitable to be adopted as the first floor plane to register the first 3D image sensor.

5. The method of claim 4, wherein computing the first floor plane further comprises:

when the variance is below the predetermined threshold, adopting the fitted plane as the first floor plane;

computing a transformation that aligns the mean normal direction to a normal direction of the floor; and applying the transformation to an entire point cloud of the first 3D image sensor to register the first 3D image sensor.

6. The method of claim 4, wherein computing the first floor plane further comprises:

when the variance is above the predetermined threshold, rejecting the first user selection; and requesting another user selection of another region of the first image for floor alignment.

7. The method of claim 2, wherein determining the region-of-interest comprises:

determining a ray line extending from a point of view to a selected point of the first user selection in the first image;

identifying the region-of-interest based on a first radius around the ray line;

accepting the region-of-interest to compute the fitted plane for floor alignment when a quantity of the plurality of candidate points in the region-of-interest is more than a predetermined threshold; and when the quantity of the plurality of candidate points in the region-of-interest is less than the predetermined threshold, rejecting the first user selection, and requesting another user selection of another region of the first image for floor alignment.

8. The method of claim 2, wherein determining the region-of-interest comprises:

determining, based on additional user selections, additional floor points on the floor in the first image; and identifying the region-of-interest based on the first floor point and the additional floor points.

9. The method of claim 2, wherein computing the fitted plane comprises:

determining candidate planes each containing at least one candidate point of the plurality of candidate points and two additional points in the first image, wherein each point in the first image is considered an inlier point passed by a candidate plane when the point is within a same predetermined distance from the candidate plane;

selecting a plane from the candidate planes, wherein the selected plane passes the most inlier points in the first image among the candidate planes; and computing the fitted plane based on the inlier points passed by the selected plane, wherein the fitted plane minimizes a sum of square distances from the inlier points to the fitted plane.

10. The method of claim 1, further comprising:

determining, based on a second user selection of a second region of a second image of the plurality of 3D images of the workcell, a second floor point indicating a second portion of the floor in the second image;

computing a second floor plane representing the floor based on the second floor point; and determining that the first floor plane is aligned with the second floor plane to register the 3D image sensors acquiring the first image and the second image, wherein the plurality of 3D image sensors are physically separated from each other by at least one meter and configured to acquire 3D images independently from each other.

11. The method of claim 1, further comprising:

adjusting a vertical offset of at least one 3D image sensor of the plurality of 3D image sensors based on a user input in view of at least one image of the workcell acquired by the at least one 3D image sensor; and determining, based on the adjusting, that a floor in the at least one image has a vertical position aligned to a floor level in a global frame of the workcell.

12. A control system for sensor registration for a workcell including a floor, the system comprising:

a plurality of three dimensional (3D) image sensors proximate to the workcell; and a controller configured to:

cause the plurality of 3D image sensors to acquire a plurality of 3D images of the workcell, wherein at least one of the plurality of 3D images includes at least a portion of the floor, determine, based on a first user selection of a region of a first image of the plurality of 3D images of the workcell, a first floor point indicating a first portion of the floor in the first image, compute a first floor plane representing the floor based on the first floor point, and register the 3D image sensors to each other and to the workcell based at least in part on the plurality of 3D images and the first floor plane.

13. The control system of claim 12, wherein the controller is further configured to:

determine, within the first image, a region-of-interest around the first floor point, wherein the region-of-interest includes a plurality of candidate points in the first image;

compute a fitted plane based on at least one of the plurality of candidate points of the region-of-interest; and determine whether the fitted plane is suitable to be adopted as the first floor plane to register a first 3D image sensor acquiring the first image.

14. The control system of claim 13, wherein the controller is further configured to:

compute a mean normal direction of the fitted plane based on a mean of normal directions of the plurality of candidate points;

compute a variance of the normal directions of the plurality of candidate points; and compare the variance to a predetermined threshold to determine whether the fitted plane is suitable to be adopted as the first floor plane to register the first 3D image sensor.

15. The control system of claim 14, wherein the controller is further configured to:

when the variance is below the predetermined threshold, adopt the fitted plane as the first floor plane, compute a transformation that aligns the mean normal direction to a normal direction of the floor, and apply the transformation to an entire point cloud of the first 3D image sensor to register the first 3D image sensor; and when the variance is above the predetermined threshold, reject the first user selection, and request another user selection of another region of the first image for floor alignment.

16. The control system of claim 13, wherein the region-of-interest is determined based on:

determining a ray line extending from a point of view to a selected point of the first user selection in the first image;

identifying the region-of-interest based on a first radius around the ray line;

accepting the region-of-interest to compute the fitted plane for floor alignment when a quantity of the plurality of candidate points in the region-of-interest is more than a predetermined threshold; and when the quantity of the plurality of candidate points in the region-of-interest is less than the predetermined threshold, rejecting the first user selection, and requesting another user selection of another region of the first image for floor alignment.

17. The control system of claim 13, wherein the region-of-interest is determined based on:

determining, based on additional user selections, additional floor points on the floor in the first image; and identifying the region-of-interest based on the first floor point and the additional floor points.

18. The control system of claim 13, wherein the controller is further configured to:

determine candidate planes each containing at least one candidate point of the plurality of candidate points and two additional points in the first image, wherein each point in the first image is considered an inlier point passed by a candidate plane when the point is within a same predetermined distance from the candidate plane;

select a plane from the candidate planes, wherein the selected plane passes the most inlier points in the first image among the candidate planes; and compute the fitted plane based on the inlier points passed by the selected plane, wherein the fitted plane minimizes a sum of square distances from the inlier points to the fitted plane.

19. The control system of claim 12, wherein the controller is further configured to:

determine, based on a second user selection of a second region of a second image of the plurality of 3D images of the workcell, a second floor point indicating a second portion of the floor in the second image;

compute a second floor plane representing the floor based on the second floor point; and determine that the first floor plane is aligned with the second floor plane to register the 3D image sensors acquiring the first image and the second image, wherein the plurality of 3D image sensors are physically separated from each other by at least one meter and configured to acquire 3D images independently from each other.

20. The control system of claim 12, wherein the controller is further configured to:

adjust a vertical offset of at least one 3D image sensor of the plurality of 3D image sensors based on a user input in view of at least one image of the workcell acquired by the at least one 3D image sensor; and determine, based on the adjusting, that a floor in the at least one image has a vertical position aligned to a floor level in a global frame of the workcell.

* * * * *